US008700755B2

(12) United States Patent
Abe

(10) Patent No.: US 8,700,755 B2
(45) Date of Patent: Apr. 15, 2014

(54) DEVICE AND A METHOD FOR TRANSMITTING LINK TRACE RESPONSES ACCORDING TO A ROUTE REDUNDANCY CONFIGURATION

(75) Inventor: Tatsuya Abe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 193 days.

(21) Appl. No.: 12/926,460

(22) Filed: Nov. 18, 2010

(65) Prior Publication Data

US 2011/0153814 A1 Jun. 23, 2011

(30) Foreign Application Priority Data

Dec. 17, 2009 (JP) .................................. 2009-286798

(51) Int. Cl.
*G06F 15/173* (2006.01)

(52) U.S. Cl.
USPC ............................ 709/223; 709/239; 370/242

(58) Field of Classification Search
USPC ................... 709/223, 224, 238, 239; 370/242
See application file for complete search history.

(56) References Cited

U.S. PATENT DOCUMENTS

| 7,768,928 | B2 | 8/2010 | Harel et al. | |
| 7,889,665 | B2 * | 2/2011 | Shaker et al. | 370/241.1 |
| 7,966,420 | B2 * | 6/2011 | Mehta et al. | 709/244 |
| 7,990,959 | B2 * | 8/2011 | Shimada | 370/389 |
| 8,098,575 | B2 | 1/2012 | Sasaki et al. | |
| 8,116,212 | B2 | 2/2012 | Kitajima | |
| 2008/0019363 | A1 * | 1/2008 | Kitajima | 370/391 |
| 2008/0168120 | A1 * | 7/2008 | Suzuyama et al. | 709/201 |
| 2009/0010254 | A1 * | 1/2009 | Shimada | 370/389 |
| 2009/0225660 | A1 * | 9/2009 | Sakurai | 370/241.1 |
| 2010/0238936 | A1 * | 9/2010 | Matsui et al. | 370/394 |

FOREIGN PATENT DOCUMENTS

| JP | 2008-172292 | 7/2008 |
| JP | 2009-117909 | 5/2009 |
| JP | 2009-212863 | 9/2009 |
| JP | 2009-543500 | 12/2009 |

OTHER PUBLICATIONS

Japanese Office Action issued May 28, 2013 in corresponding Japanese Application No. 2009-286798.

\* cited by examiner

*Primary Examiner* — Oanh Duong

(74) *Attorney, Agent, or Firm* — Staas & Halsey LLP

(57) ABSTRACT

A transmission device is included in a communication network, and the transmission device includes a link trace frame transfer unit that transfers, from a first transferring port corresponding to an operation system route, a first link trace frame that is received and that is destined to a target transmission device, and that transfers, from a second transferring port corresponding to a preliminary system route, a second link trace frame that is distinguishable from the first link trace frame, when transferring ports of the transmission device have a route redundancy configuration; and a link trace response frame transmission unit that transmits, in response to receiving the second link trace frame, a second link trace response frame to an origin transmission device, the second link trace response frame being distinguishable from a first link trace response frame that is transmitted in response to receiving the first link trace frame.

9 Claims, 18 Drawing Sheets

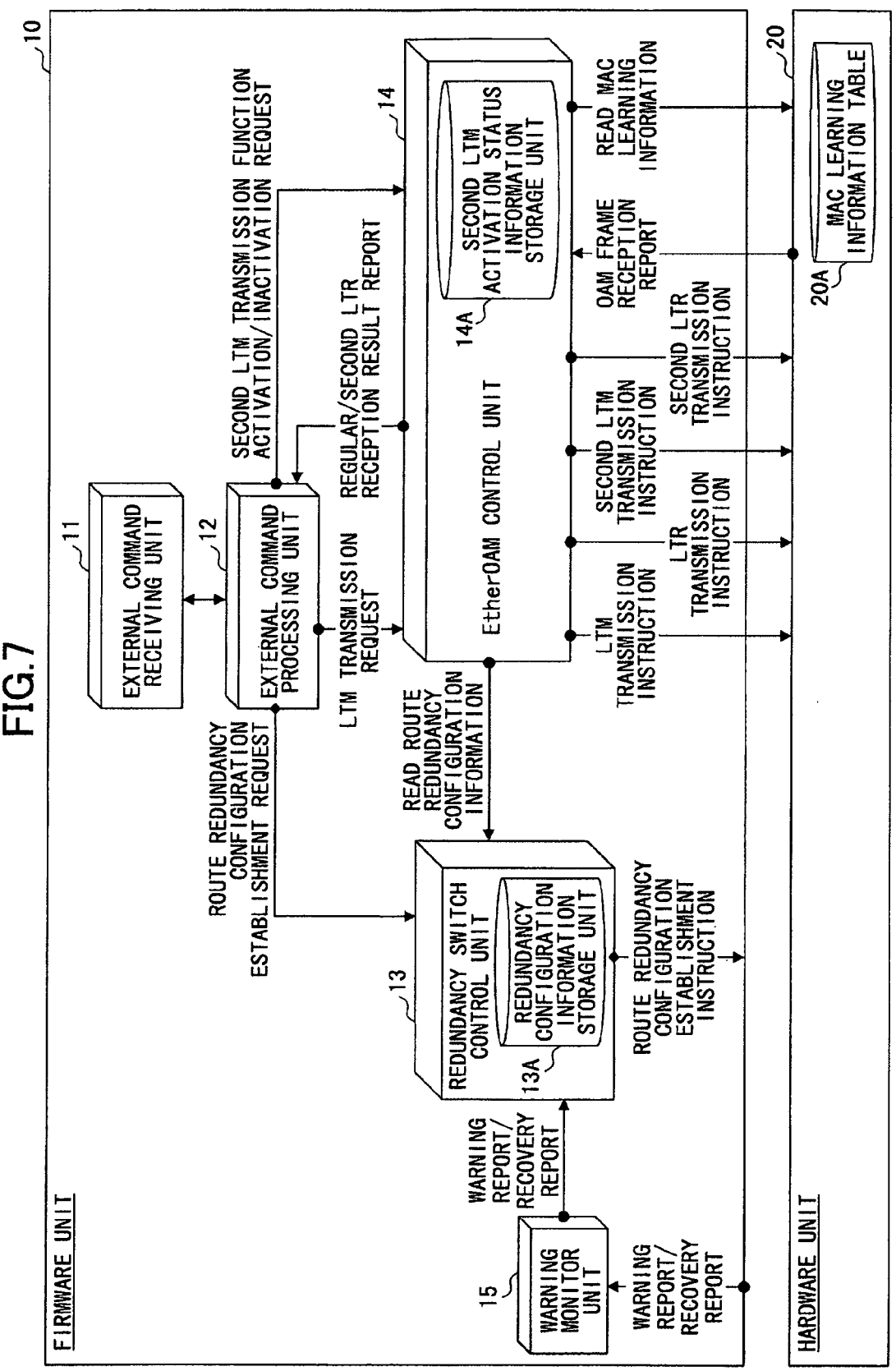

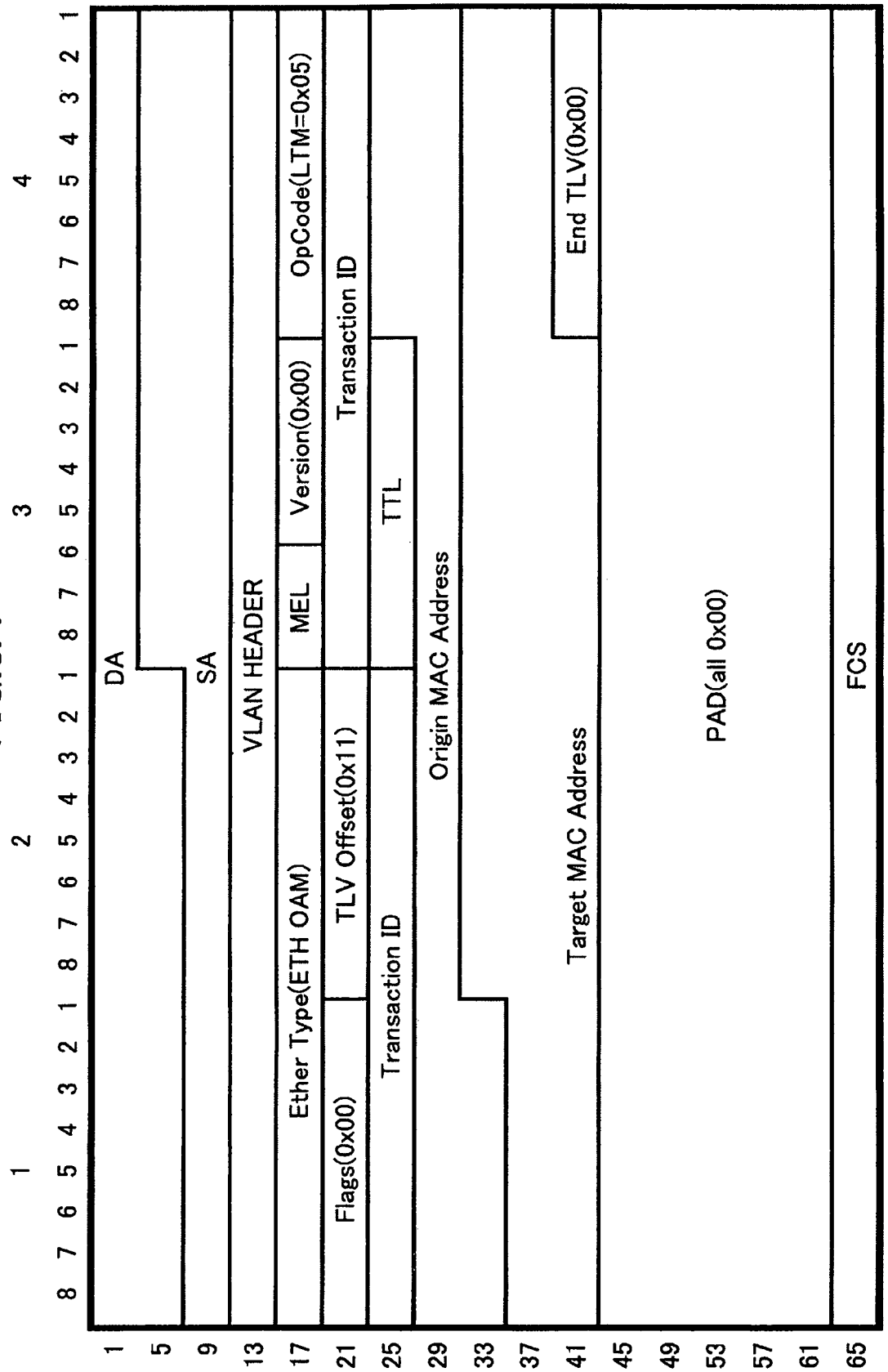

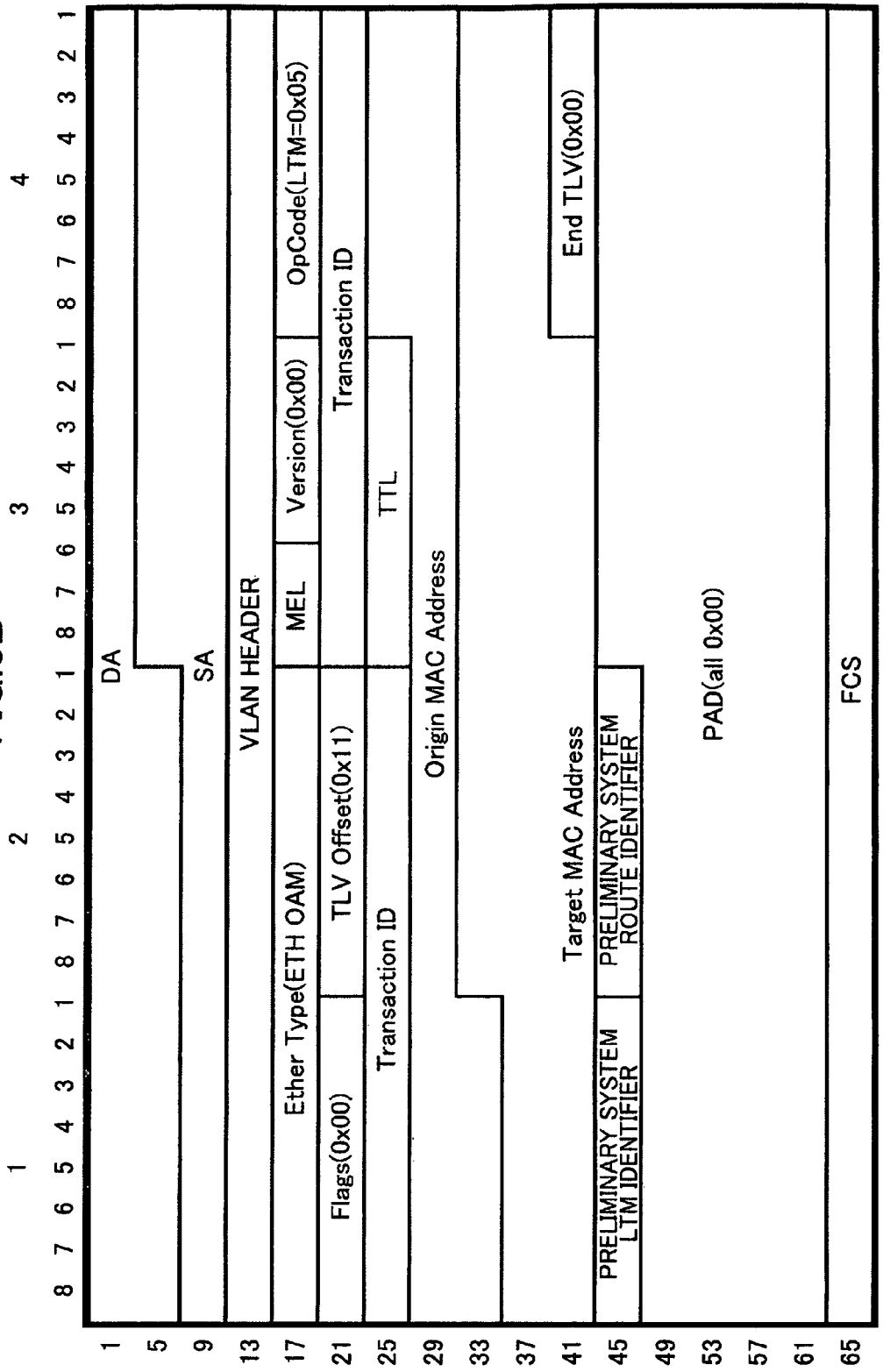

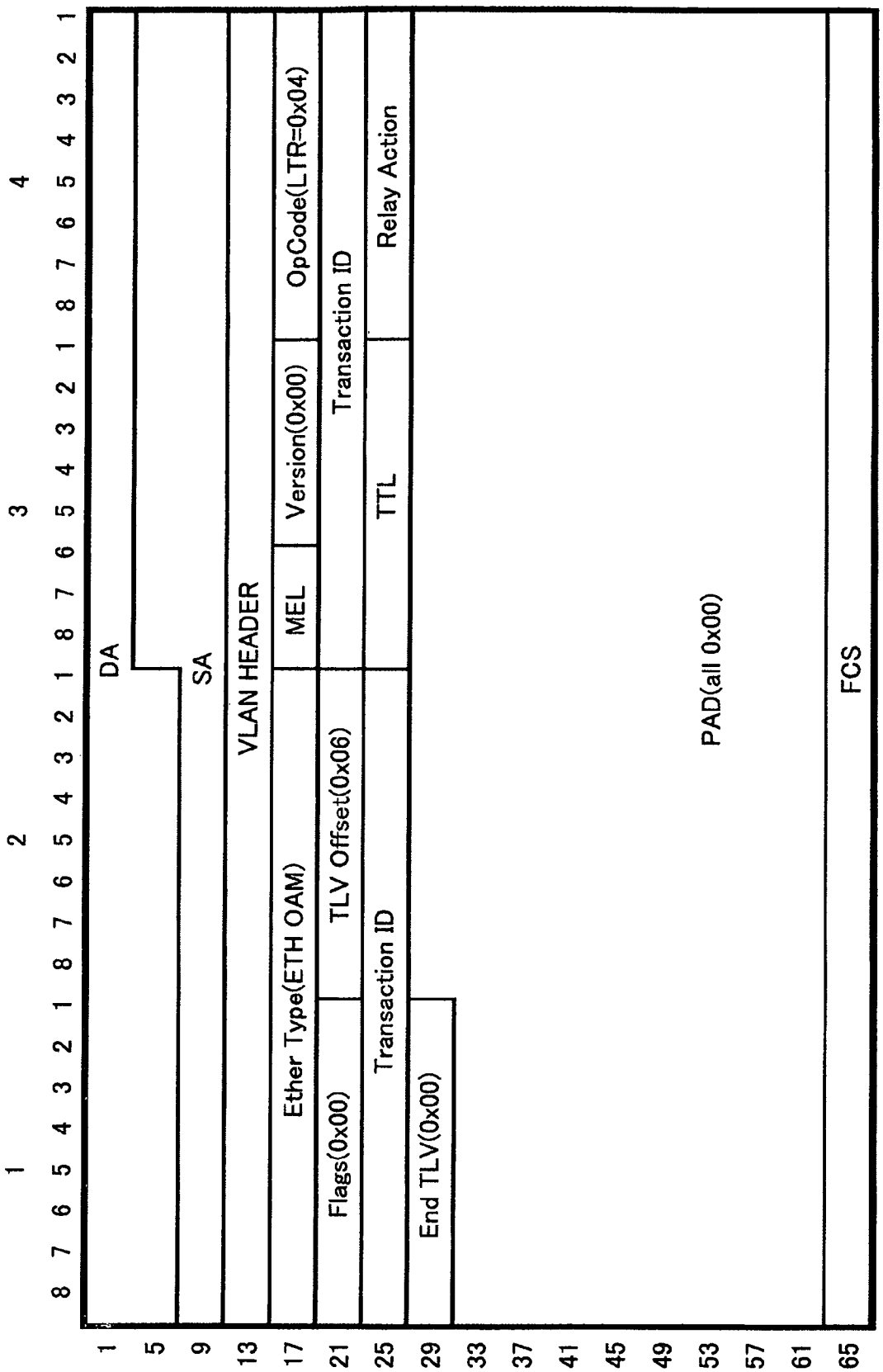

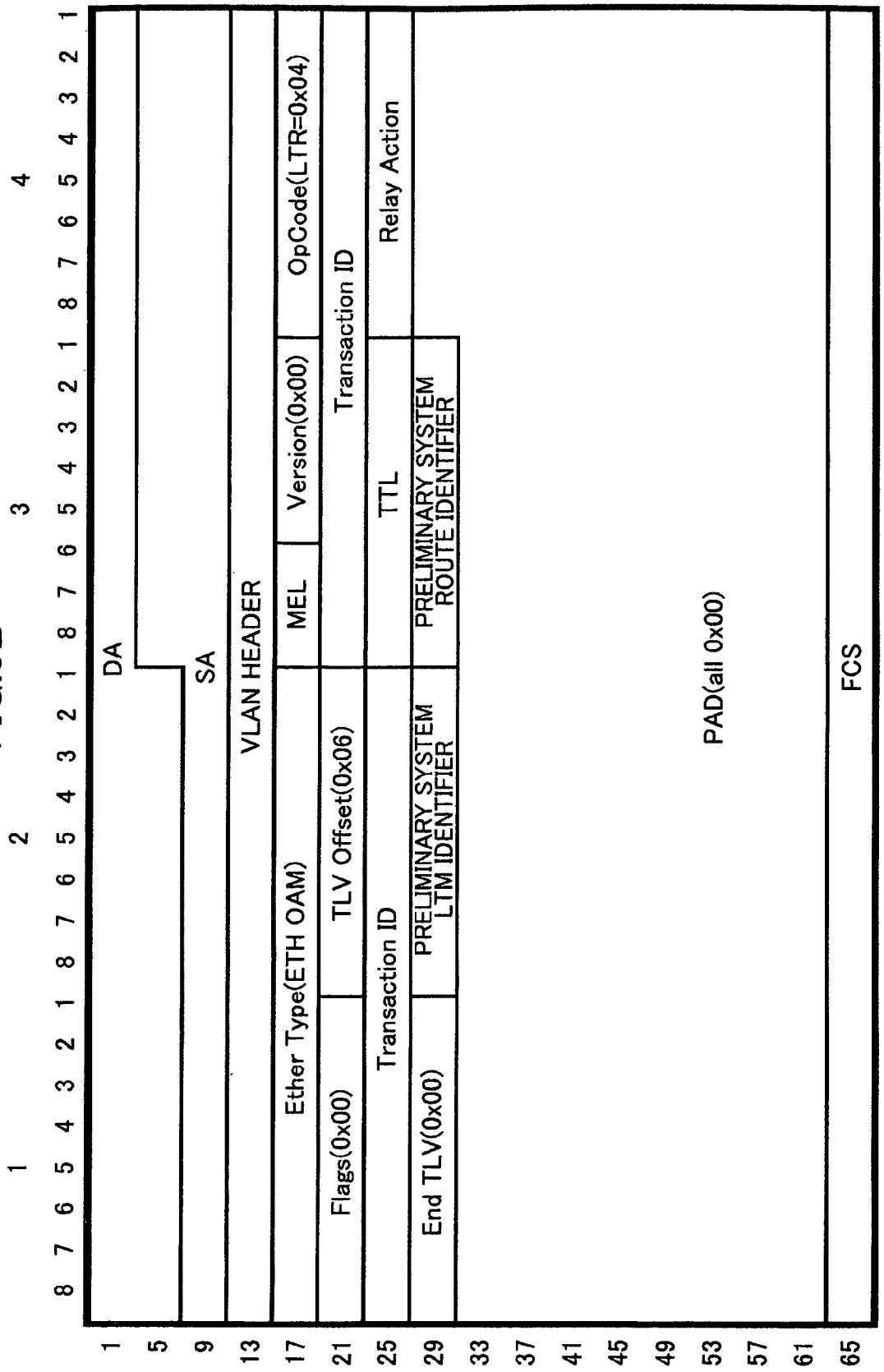

DEVICE AND A METHOD FOR TRANSMITTING LINK TRACE RESPONSES ACCORDING TO A ROUTE REDUNDANCY CONFIGURATION

CROSS-REFERENCE TO RELATED APPLICATIONS

This patent application is based upon and claims the benefit of priority of the prior Japanese Patent Application No. 2009-286798 filed on Dec. 17, 2009, the entire contents of which are incorporated herein by reference.

FIELD

The embodiments discussed herein are related to a communication route determination method and a transmission device.

BACKGROUND

For example, Japanese Laid-Open Patent Application No. 2008-172292 discloses the following technology of identifying the location of a failure in a network. When a failure occurs, information relevant to the network is deleted from a MAC learning table. However, before deleting the information, the information is saved in a storage unit. A link trace function is implemented for transmitting and receiving link trace signals with ports by referring to the saved information. Accordingly, the location of the failure is identified.

SUMMARY

According to an aspect of the invention, a transmission device included in a communication network includes a link trace frame transfer unit that transfers, from a first transferring port corresponding to an operation system route, a first link trace frame that is received and that is destined to a target transmission device, and that transfers, from a second transferring port corresponding to a preliminary system route, a second link trace frame that is distinguishable from the first link trace frame, when transferring ports of the transmission device have a route redundancy configuration; and a link trace response frame transmission unit that transmits, in response to receiving the second link trace frame, a second link trace response frame to an origin transmission device, the second link trace response frame being distinguishable from a first link trace response frame that is transmitted in response to receiving the first link trace frame.

According to an aspect of the invention, a communication route determination method, which is for determining communication routes in a communication network that uses a route redundancy configuration, includes transferring a first link trace frame from an origin transmission device to a target transmission device along an operation system route; transmitting a first link trace response frame from a transmission device that has received the first link trace frame to the origin transmission device; transferring a second link trace frame that is distinguishable from the first link trace frame along a preliminary system route; and transmitting a second link trace response frame, which is distinguishable from the first link trace response frame, from a transmission device that has received the second link trace frame to the origin transmission device.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 7 illustrates a transmission device according to an embodiment of the present invention;

FIG. 8A illustrates a standard LTM frame format and FIG. 8B illustrates a second LTM frame format;

FIG. 9A illustrates a standard LTR frame format and FIG. 9B illustrates a second LTR frame format;

DESCRIPTION OF EMBODIMENTS

As a function for maintaining and managing an Ethernet (registered trademark) network, a specification referred to as EtherOAM (operation, administration, management) is specified as Y.1731 in ITU-T, and as 802.1ag in IEEE. EtherOAM includes a link trace function for managing failures of networks.

With the link trace function, LTM (Link Trace Message) frames and LTR (Link Trace Reply) frames are exchanged between communication transmission devices in a communication network. By doing so, it is possible to determine the communication routes between the communication transmission devices and to identify the locations of failures that arise in the communication.

Figure 1:
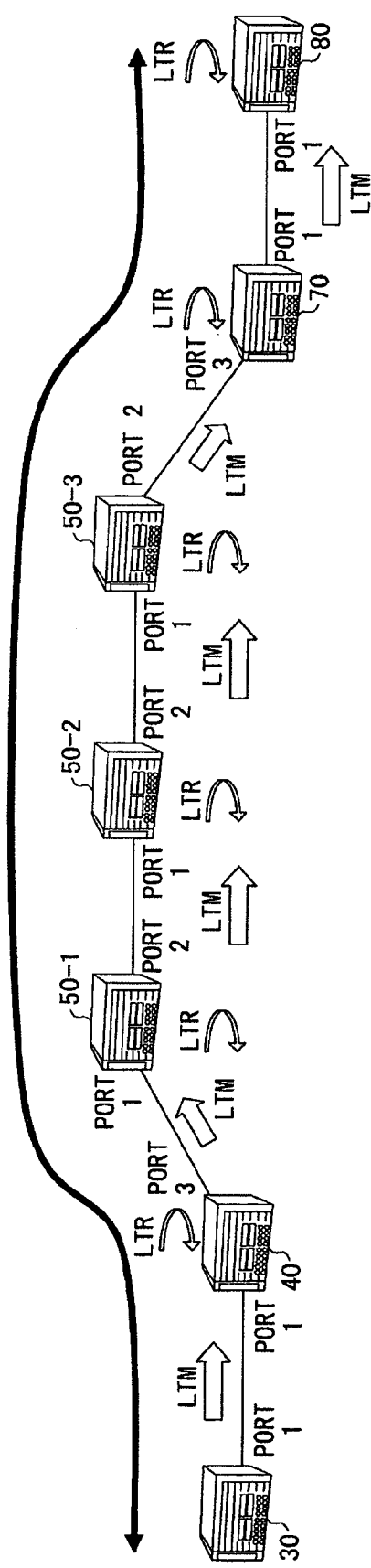
FIG. 1 illustrates an example of a communication network.

FIG. 1 illustrates an example of a communication network. In the communication network illustrated in FIG. 1, it is assumed as follows. That is, main signals are communicated in a route extending along a transmission device 30, a transmission device 40, a transmission device 50-1, a transmission device 50-2, a transmission device 50-3, a transmission device 70, and a transmission device 80. The transmission device 40 has learned the MAC address of the transmission device 80 at port 3. The transmission devices 50-1, 50-2, and 50-3 have learned the MAC address of the transmission device 80 at port 2. The transmission device 70 has learned the MAC address of the transmission device 80 at port 1.

In the communication network illustrated in FIG. 1, when link trace is performed from the transmission device 30 to the transmission device 80, the transmission device 30 transmits an LTM frame to the transmission device 80 by specifying the MAC address of the transmission device 80 that is the target. When an intermediate transmission device has learned the MAC address of the transmission device 80, the corresponding intermediate transmission device transfers the LTM frame only to ports that have learned the MAC address, and returns an LTR frame to the transmission device 30. When an intermediate transmission device has not learned the MAC address of the transmission device 80, the corresponding intermediate transmission device does not return an LTR frame to the transmission device 30, and transfers an LTM frame to all ports that are flooding targets.

By repeating the above operation until the LTM frame reaches the transmission device 80 that is the target, the transmission device 30 sequentially receives LTR frames from the transmission devices 40, 50-1, 50-2, 50-3, 70, and 80, and determines the communication route to the transmission device 80.

Figure 2:
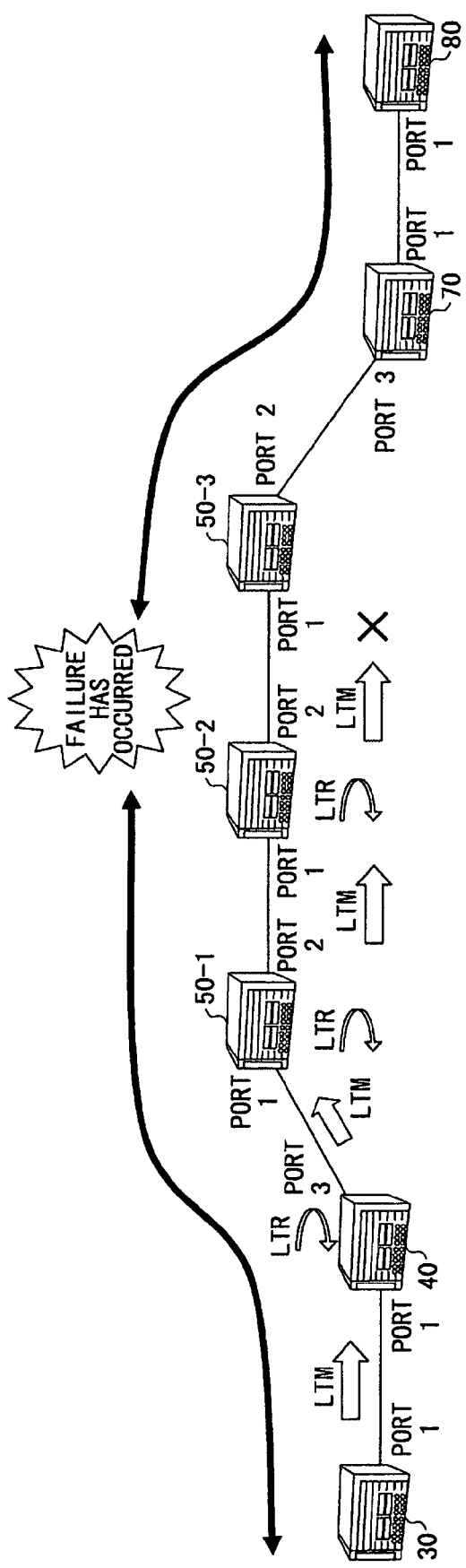
FIG. 2 illustrates an example of a communication network when a failure has occurred.

FIG. 2 illustrates an example of a communication network when a failure has occurred. As illustrated in FIG. 2, a failure has occurred between the transmission device 50-2 and the transmission device 50-3. Thus, main signals are communicated only in a route extending along the transmission device 30, the transmission device 40, the transmission device 50-1, and the transmission device 50-2, and in a route extending along the transmission device 50-3, the transmission device 70, and the transmission device 80. Furthermore, it is assumed as follows. That is, the transmission device 40 has learned the MAC address of the transmission device 80 at port 3. The transmission devices 50-1, 50-2, and 50-3 have learned the MAC address of the transmission device 80 at port 2. The transmission device 70 has learned the MAC address of the transmission device 80 at port 1.

In the example illustrated in FIG. 2, when link trace is performed from the transmission device 30 to the transmission device 80, the transmission device 30 only receives LTR frames from the transmission devices 40, 50-1, and 50-2. Therefore, the transmission device 30 identifies that a failure has occurred in a route beyond the transmission device 50-2. Furthermore, when link trace is performed from the transmission device 80 to the transmission device 30, the transmission device 80 identifies that the failure has occurred in a route beyond the transmission device 50-3. Thus, by combining this result with the result obtained by performing link trace from the transmission device 30 to the transmission device 80, it is possible to identify that the failure has occurred between the transmission device 50-2 and the transmission device 50-3.

Figure 3:
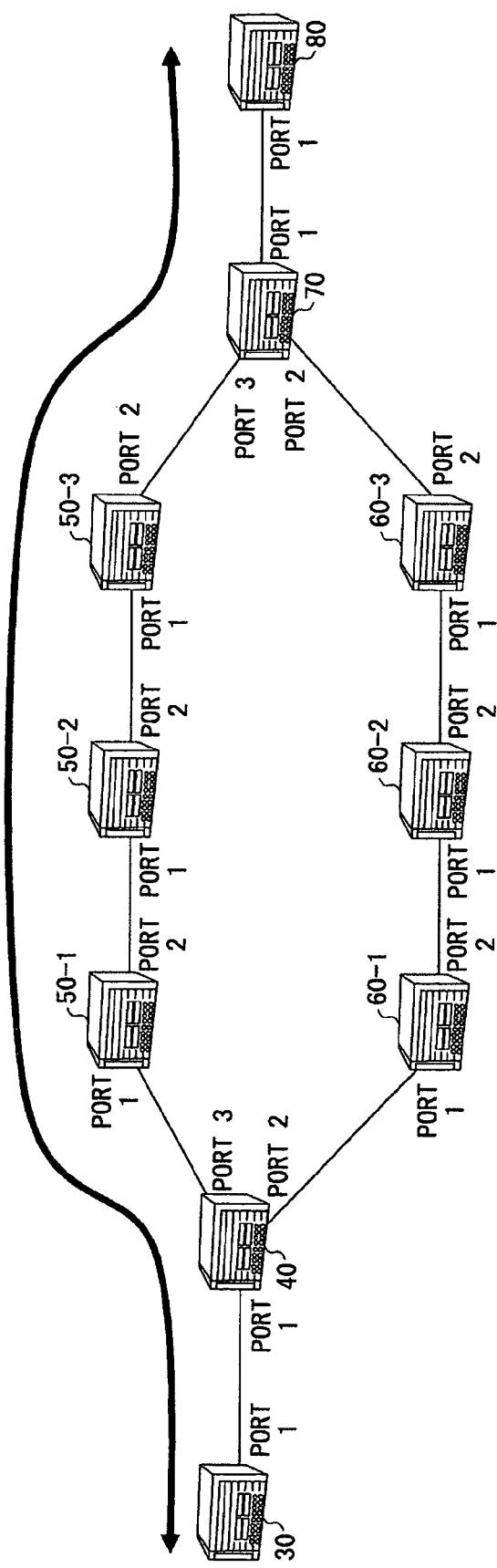
FIG. 3 illustrates a communication network according to an embodiment of the present invention.

FIG. 3 illustrates an example of a communication network. Communication networks typically have a route redundancy configuration as illustrated in FIG. 3, in order to be prepared for failures. In the example of FIG. 3, an Ether OAM CC (Continuity Check) function is used between the transmission device 40 and the transmission device 70, so that route redundancy is provided from end to end. In this network, the communication route may be switched between a first route and a second route, depending on the condition of the failure. The first route extends along the transmission device 30, the transmission device 40, the transmission device 50-1, the transmission device 50-2, the transmission device 50-3, the transmission device 70, and the transmission device 80. The second route extends along the transmission device 30, the transmission device 40, a transmission device 60-1, a transmission device 60-2, a transmission device 60-3, the transmission device 70, and the transmission device 80. Hereinafter, the route that is actually operated (i.e., the route used for communications) is referred to as an operation system route, while the route used when a failure occurs in the operation system route is referred to as a preliminary system route.

Figure 4:
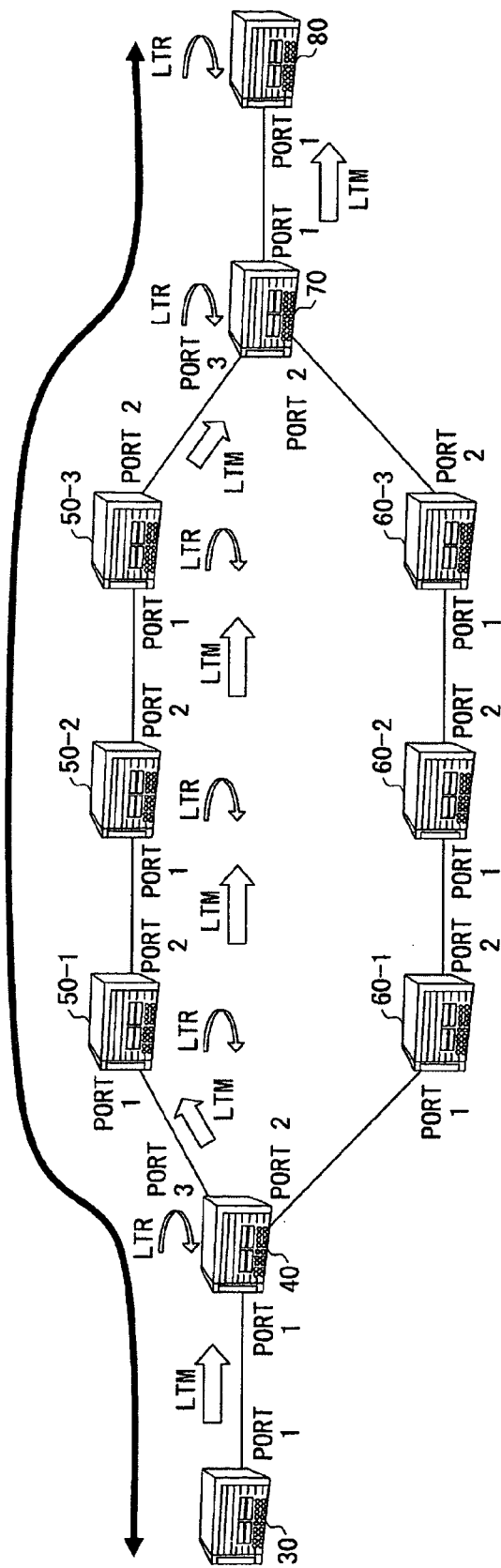
FIG. 4 is for describing link trace in a communication network.
Figure 5:
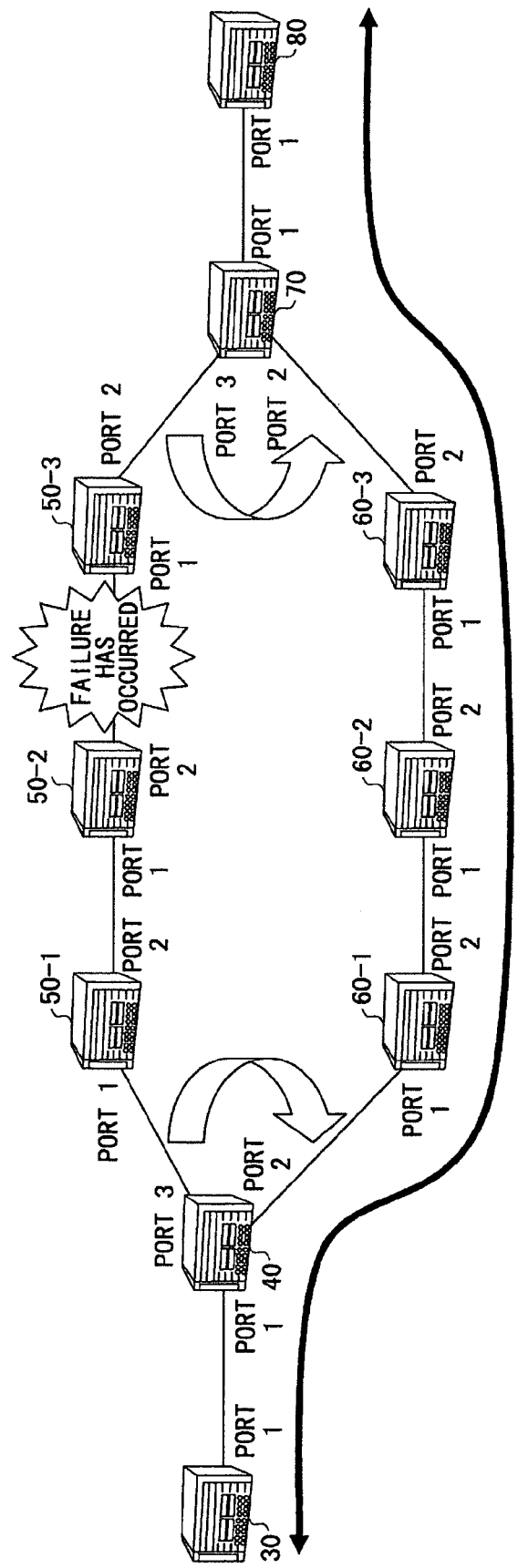
FIG. 5 is for describing the operation of switching paths in a communication network.

In such a communication network having a route redundancy configuration, it is possible to determine the operation system route as illustrated in FIG. 4 by performing link trace. As illustrated in FIG. 5, when the route is switched from the operation system route to the preliminary system route due to a failure in the network having a route redundancy configuration, it is determined that a failure has occurred. Specifically, with the use of a switch trap or a LOC (Loss of Continuity) detection trap in the end transmission devices implementing the route redundancy function (i.e., the transmission device 40 and the transmission device 70), it is possible to determine that a failure has occurred somewhere along the route extending along the transmission device 40, the transmission device 50-1, the transmission device 50-2, the transmission device 50-3, and the transmission device 70. However, it is not possible to specifically identify the section where the failure has occurred.

Figure 6:
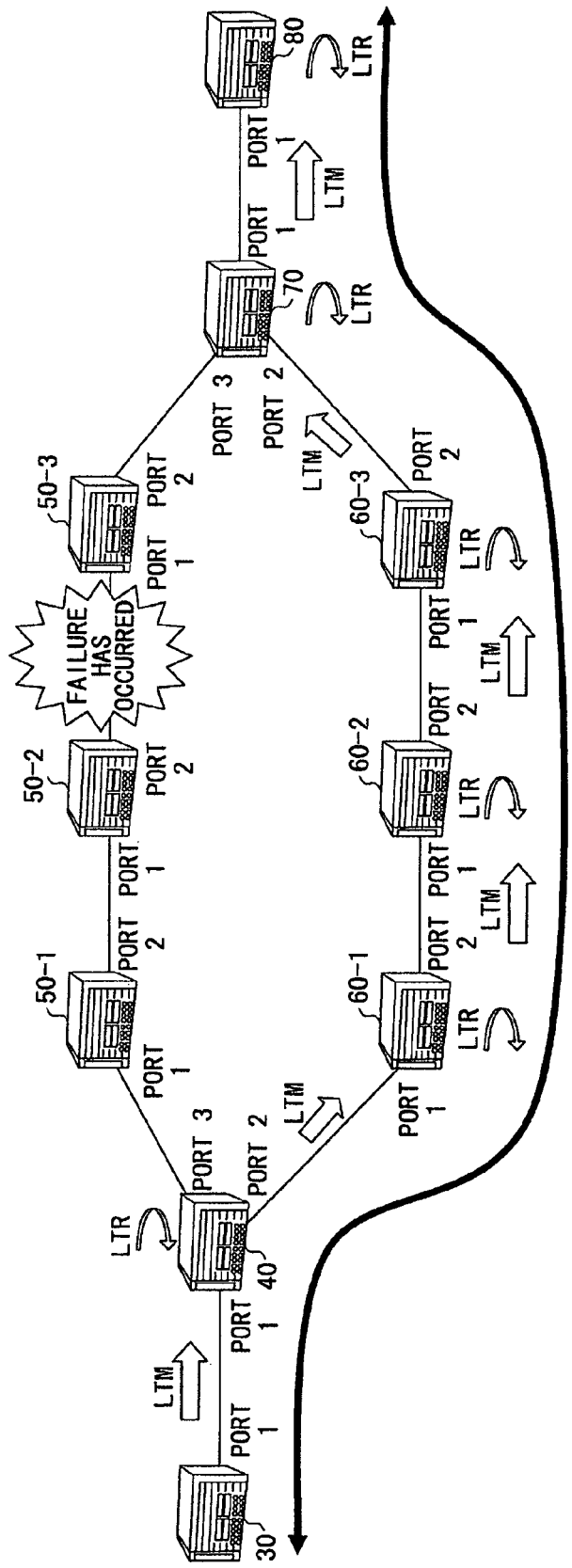
FIG. 6 is for describing link trace after the path has been switched in a communication network.

Furthermore, as illustrated in FIG. 6, even if an attempt is made to perform link trace between the transmission device 30 and the transmission device 80 under the above-described condition, it is only possible to acquire the route information relevant to the preliminary system route (the transmission device 30, the transmission device 40, the transmission device 60-1, the transmission device 60-2, the transmission device 60-3, the transmission device 70, and the transmission device 80). This is because the MAC address of the transmission device 80 is learned once again in the preliminary system route to which the communication has switched. Consequently, it is not possible to identify the section where the failure has occurred (the section between the transmission device 50-2 and the transmission device 50-3). Hence, merely by implementing a link trace function for standardization, it is not possible to identify the section where the failure has occurred, because the MAC learning information changes as a result of recovering the communication with the use of the route redundancy configuration.

Preferred embodiments of the present invention will be explained with reference to accompanying drawings.

<Configuration of Transmission Device>

FIG. 7 illustrates a transmission device according to an embodiment of the present invention. As illustrated in FIG. 7, the transmission device includes a firmware unit 10 and a hardware unit 20. An external command receiving unit 11 in the firmware unit 10 receives an external command from a user through LAN, RS232C, etc., and supplies the received command to an external command processing unit 12. The external command receiving unit 11 reports, to the user, a regular LTR reception result and a second LTR reception result supplied from the external command processing unit 12. The regular LTR reception result and the second LTR reception result are distinguished from each other in the report to the user.

The external command processing unit 12 allocates the external command from the user into to appropriate functional blocks. That is, the external command processing unit 12 supplies a route redundancy configuration establishment request to a redundancy switch control unit 13, supplies an LTM transmission request to an EtherOAM control unit 14, and supplies a second LTM transmission function activation request or a second LTM transmission function inactivation request to the EtherOAM control unit 14. The external command processing unit 12 receives the regular LTR reception result and the second LTR reception result from the EtherOAM control unit 14.

The redundancy switch control unit 13 controls the overall redundancy switching operation, and includes a route redundancy configuration information storage unit 13A. Specifically, the redundancy switch control unit 13 receives the route redundancy configuration establishment request from the external command processing unit 12. Furthermore, route redundancy configuration information is read from the redundancy switch control unit 13 by the EtherOAM control unit 14. Furthermore, a warning monitor unit 15 supplies a warning report or a recovery report to the redundancy switch control unit 13. Furthermore, the redundancy switch control unit 13 supplies a route redundancy configuration establishment instruction to the hardware unit 20.

The EtherOAM control unit 14 controls the overall EtherOAM process, and includes a second LTM activation status information storage unit 14A. Specifically, the EtherOAM control unit 14 sends, to the hardware unit 20, an LTM transmission instruction, an LTR transmission instruction, a second LTM transmission instruction, and a second LTR transmission instruction. Furthermore, the EtherOAM control unit 14 reads MAC learning information from the hardware unit 20. The EtherOAM control unit 14 receives an OAM frame reception report from the hardware unit 20.

The warning monitor unit 15 monitors and controls all warnings in the transmission device. Specifically, the warning monitor unit 15 receives a warning report or a recovery report from the hardware unit 20, and then supplies the warning report or the recovery report to the redundancy switch control unit 13.

The hardware unit 20 includes plural ports to which communication routes are connected. Furthermore, the hardware unit 20 includes a MAC learning information table 20A.

The above transmission device also transmits, in the preliminary system route, a special second LTM frame that is distinguishable from a regular LTM frame. The transmission device that has received the second LTM frame performs a different operation from that of a case where a regular LTM frame is received. Specifically, the transmission device returns, to the source transmission device from which the second LTM frame has been received, a second LTR frame that is distinguishable from a regular LTR frame, regardless of the MAC address learning status (regardless of whether the transmission device has learned the MAC address of the target transmission device).

FIG. 8A illustrates a standard LTM frame format specified in Y.1731 of ITU-T, and FIG. 8B illustrates a special second LTM frame format used according to an embodiment of the present invention. The example of FIG. 8A includes a transmission destination address (DA), a transmission source address (SA), a VLAN header, an Ether type (EtherOAM), a MEL (Maintenance Entity group Level), a version, an operation code (LTM=0x05), flags (=0x00), TVL offset (=0x11), transaction ID, TTL, origin MAC address (address of transmission device at origin of link trace), target original MAC address (address of transmission device at target of link trace), end TLV (=0x00), and PAD (all 0x00).

In the example of FIG. 8B, at the 45th octet after the end TLV (=0x00), a preliminary system LTM identifier having a length of one octet is provided for identifying the second LTM frame. When 0x00 is indicated, the frame is determined to be a regular LTM frame, and when 0xFF is indicated, the frame is determined to be a second LTM frame. In order to identify each preliminary system route in a network including plural preliminary system routes as in a 1:N route redundancy network, a preliminary system route identifier having a length of one octet is provided at the 46th octet. Different values are assigned as the identifiers for the preliminary system routes to identify the preliminary system routes. This is merely one example; the method of identifying regular LTM frames and second LTM frames and the method of identifying preliminary system routes in a network including plural preliminary system routes are not limited to these examples.

FIG. 9A illustrates a standard LTR frame format specified in Y.1731 of ITU-T, and FIG. 9B illustrates a special second LTR frame format used according to an embodiment of the present invention. The example of FIG. 9A includes a transmission destination address (DA), a transmission source address (SA), a VLAN header, an Ether type (EtherOAM), a MEL (Maintenance Entity group Level), a version, an operation code (LTR=0x04), flags (=0x00), TVL offset (=0x06), transaction ID, TTL, relay action, end TLV (=0x00), and PAD (all 0x00).

In the example of FIG. 9B, at the 30th octet after the end TLV (=0x00), a preliminary system LTR identifier having a length of one octet is provided for identifying the second LTR frame. When 0x00 is indicated, the frame is determined to be a regular LTR frame, and when 0xFF is indicated the frame is determined to be a second LTR frame. In order to identify each preliminary system route in a network including plural preliminary system routes as in a 1:N route redundancy network, a preliminary system route identifier having a length of one octet is provided at the 31st octet. Different values are assigned as the identifiers for the preliminary system routes to identify the preliminary system routes. This is merely one example; the method of identifying regular LTR frames and second LTR frames and the method of identifying preliminary system routes in a network including plural preliminary system routes are not limited to these examples.

The transmission device has the following functions for transmitting the special second LTM frame and the second LTR frame.

The first function is for using a PAD area, etc., of the LTM frame to support a special second LTM frame that is distinguishable from a regular LTM frame.

The second function is implemented as follows. When an LTM frame is received, the LTM frame is transferred to a subsequent stage. It is assumed that the transfer target ports (the ports used for transferring LTM frames) have a route redundancy configuration (i.e., there are plural ports corresponding to different routes). In this case, the LTM frame is transferred to the target port according to a regular operation (i.e., the LTM frame is transferred to a port corresponding to an operation system route). Then, when a second LTM frame is received, which is distinguishable from a regular LTM frame, the second LTM frame is transferred to a port corresponding to a preliminary system route. When there are plural preliminary system routes in a 1:N route redundancy network, identifiers for distinguishing the preliminary system routes are inserted in the PAD areas of the LTM frames.

The third function is for controlling whether to activate or inactivate the second function with external commands.

The fourth function is for using a PAD area, etc., of the LTR frame to support a second LTR frame that is distinguishable from a regular LTR frame.

The fifth function is implemented as follows. In a case where a second LTM frame is received, a second LTR frame is returned to the source transmission device from which the second LTM frame has been received. In this case, the second LTR frame that is returned is distinguishable from a regular LTR frame. Such a second LTR frame is defined by the fourth function, regardless of the target MAC address learning status.

The sixth function is implemented as follows. When a second LTM frame is received, the second LTR frame for a preliminary system route described in the fifth function is returned. When the port that has received the second LTM frame is of a route redundancy configuration, the port discards the received LTM frame.

The seventh function is implemented as follows. The second LTM frames and second LTR frames are transmitted/received by means of the hardware, regardless of the type of route redundancy configuration, even by ports corresponding to the preliminary system route. Specifically, in one type of route redundancy configuration, frames received by ports in the preliminary system route are discarded, so that frames are prevented from being received redundantly. In another type of route redundancy configuration, frames transmitted by ports in the preliminary system route are discarded, so that frames are prevented from being received redundantly. However, with the seventh function, in either type of route redundancy configuration, the second LTM frames and the second LTR frames are exempted from being discarded and are thus transmitted/received regardless of the type of route redundancy configuration.

The eighth function is implemented as follows. The origin transmission device transmitting the LTM frame distinguishes between regular LTR frames and LTR frames for the preliminary system route, and displays LTR reception results in the order in which the LTR frames are received. Accordingly, it is possible to report to the user whether the operation system route is used or whether the preliminary system route is used.

The operations of receiving second LTM frames and second LTR frames are the same as the operations of receiving regular LTM frames and regular LTR frames.

<Flowcharts of Various Processes Executed by Transmission Device>

Figure 10:
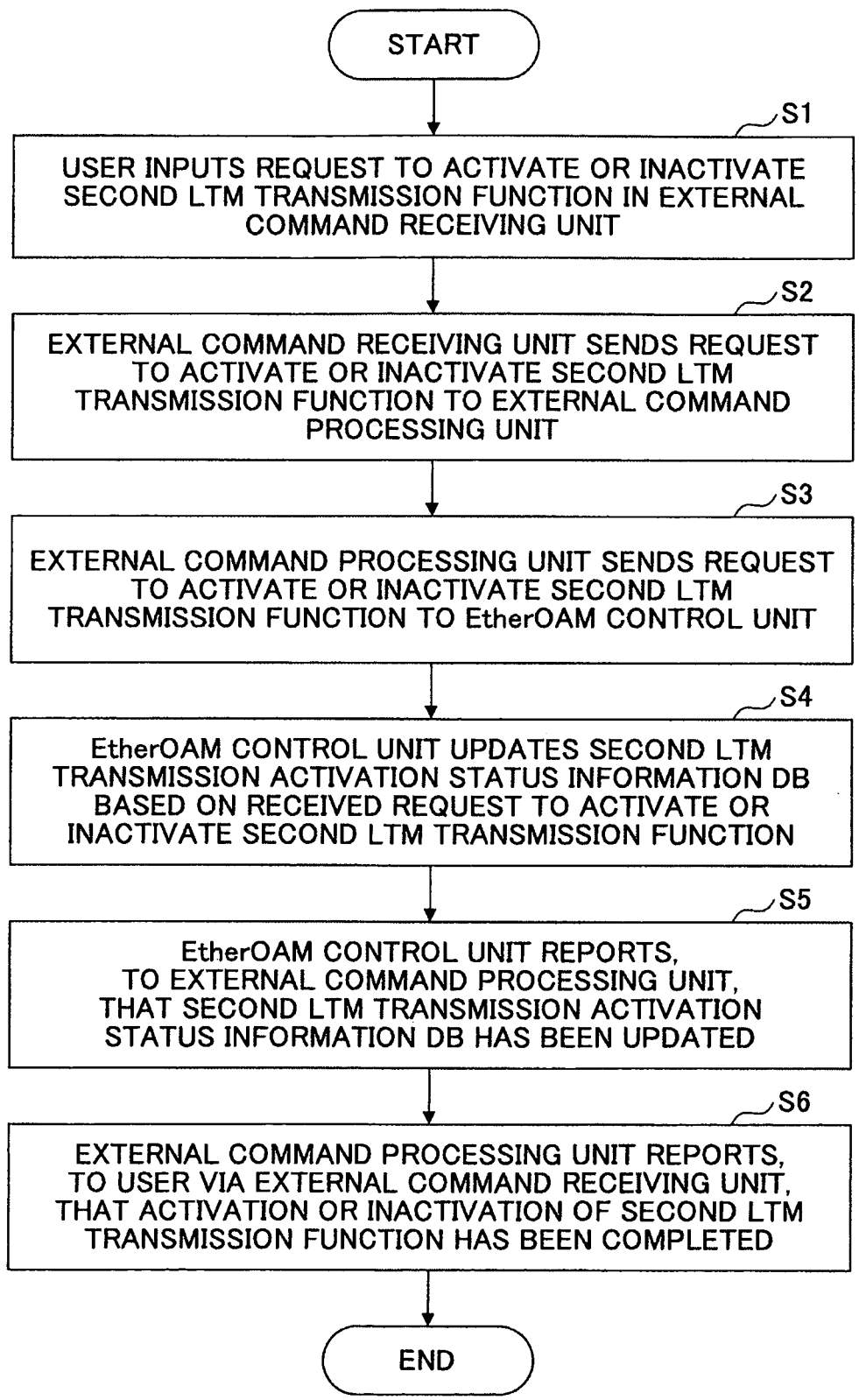
FIG. 10 is a flowchart of a process of activating or inactivating a second LTM transmission function.

FIG. 10 is a flowchart of a process of activating or inactivating the second LTM transmission function executed by the transmission device. Referring to FIG. 10, in step S1, the user inputs, in the external command receiving unit 11, a request to activate or inactivate the second LTM transmission function. In step S2, the external command receiving unit 11 sends the request to activate or inactivate the second LTM transmission function to the external command processing unit 12.

In step S3, the external command processing unit 12 sends the request to activate or inactivate the second LTM transmission function to the EtherOAM control unit 14. In step S4, the EtherOAM control unit 14 updates the second LTM transmission activation status information in the second LTM activation status information storage unit 14A, based on the received request to activate or inactivate the second LTM transmission function.

In step S5, the EtherOAM control unit 14 reports, to the external command processing unit 12, that the second LTM transmission activation status information has been updated. In step S6, the external command processing unit 12 reports, to the user via the external command receiving unit 11, that the activation or inactivation of the second LTM transmission function has been completed. Then, the process ends.

Figure 11:
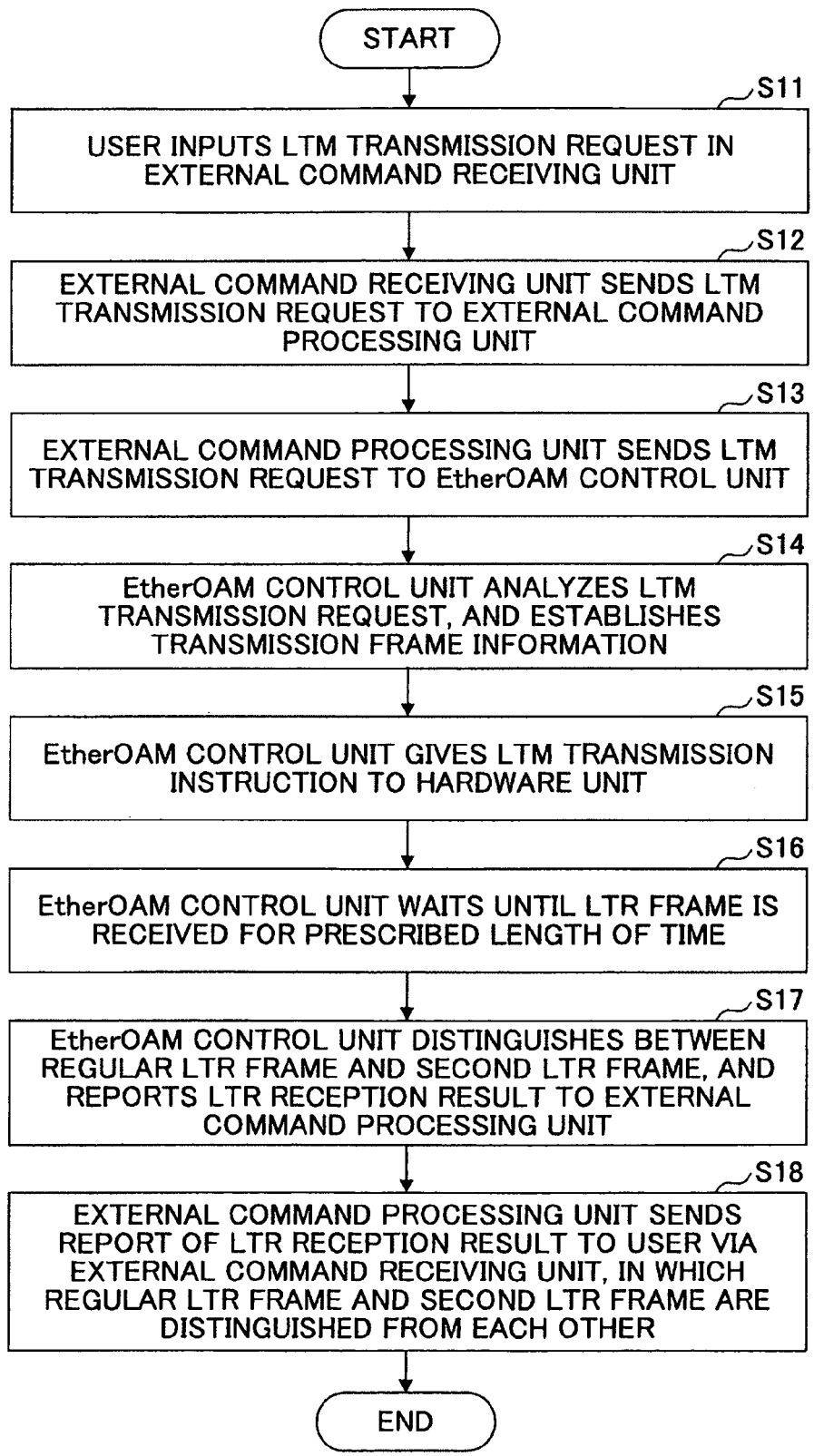
FIG. 11 is a flowchart of a LTM transmission process.

FIG. 11 is a flowchart of a LTM transmission process executed by the transmission device. Referring to FIG. 11, in step S11, the user inputs an LTM transmission request in the external command receiving unit 11. In step S12, the external command receiving unit 11 sends the LTM transmission request to the external command processing unit 12. In step S13, the external command processing unit 12 sends the LTM transmission request to the EtherOAM control unit 14.

In step S14, the EtherOAM control unit 14 analyzes the LTM transmission request, and establishes transmission frame information. In step S15, the EtherOAM control unit 14 gives an LTM transmission instruction to the hardware unit 20. In step S16, the EtherOAM control unit 14 waits until an LTR frame is received for a prescribed length of time.

In step S17, the EtherOAM control unit 14 distinguishes between a regular LTR frame and a second LTR frame, and reports the LTR reception result to the external command processing unit 12. In step S18, the external command processing unit 12 sends a report of the LTR reception result to the user via the external command receiving unit 11, in which a regular LTR frame and a second LTR frame are distinguished from each other. Then, the process ends.

Figure 12:
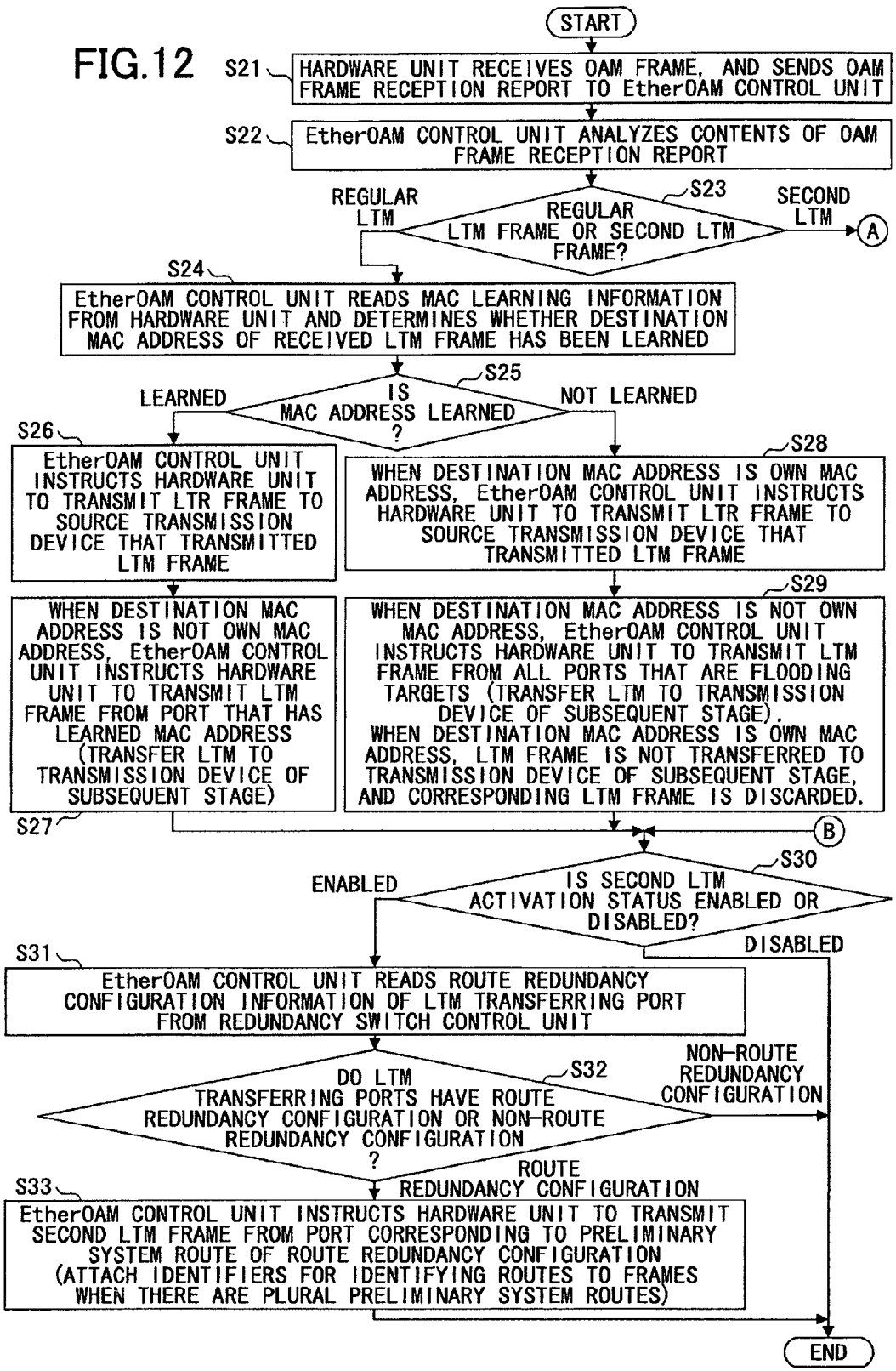
FIG. 12 is a flowchart of a LTM reception process (part 1)
Figure 13:
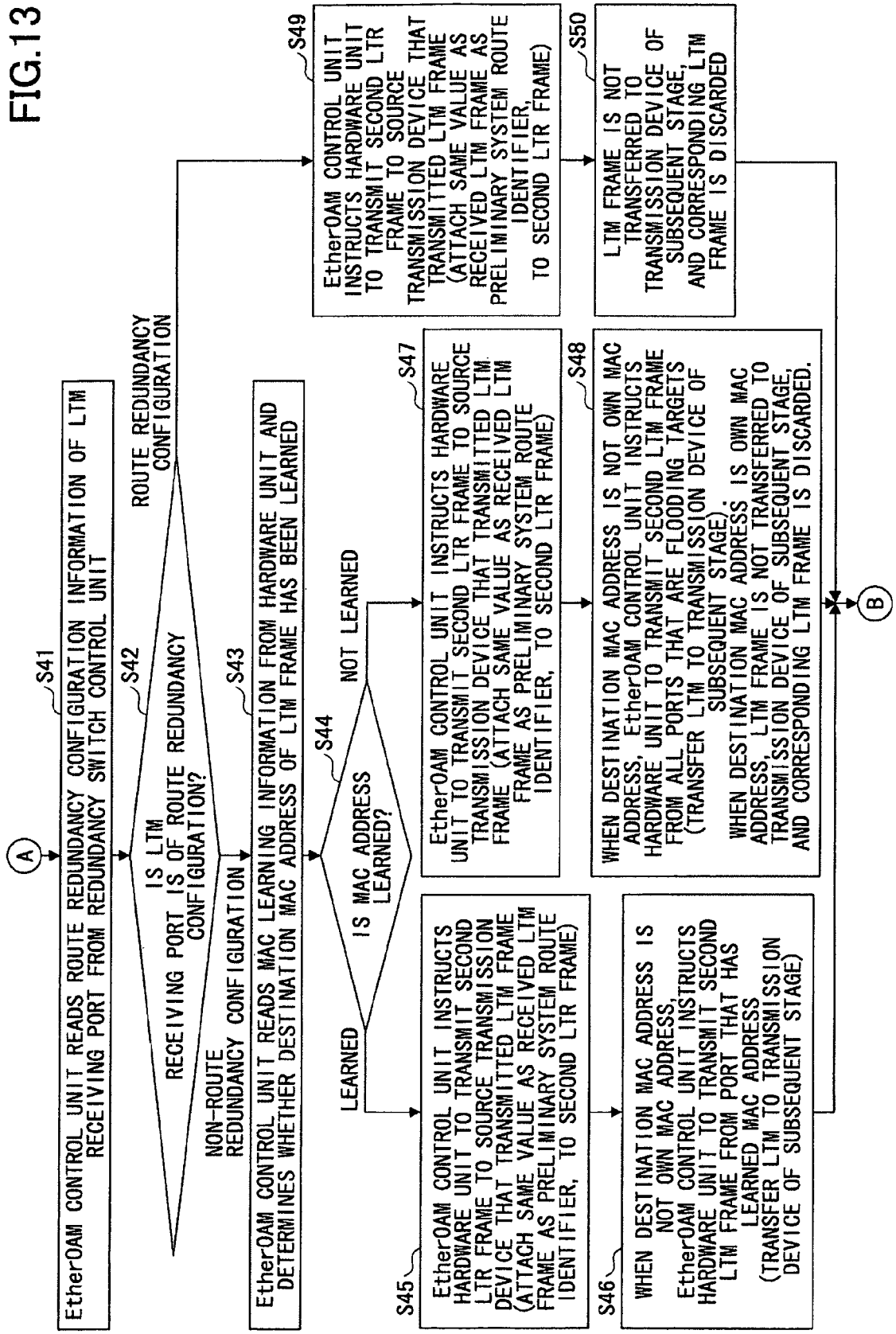
FIG. 13 is a flowchart of a LTM reception process (part 2)

FIGS. 12 and 13 are flowcharts of an LTM reception process executed by the transmission device. Referring to FIG. 12, in step S21, the hardware unit 20 receives an OAM frame, and sends an OAM frame reception report to the EtherOAM control unit 14. In step S22, the EtherOAM control unit 14 analyzes the contents of the OAM frame reception report. In step S23, the EtherOAM control unit 14 determines whether the received OAM frame is a regular LTM frame or a second LTM frame based on the analysis result. When a regular LTM frame is received, the process proceeds to step S24.

In step S24, the EtherOAM control unit 14 reads MAC learning information from the hardware unit 20, and determines, in step S25, whether the destination MAC address of the received LTM frame has been learned. When the destination MAC address of the received LTM frame has been learned, the process proceeds from step S25 to step S26.

In step S26, the EtherOAM control unit 14 instructs the hardware unit 20 to transmit an LTR frame to the source transmission device that has transmitted the LTM frame. Subsequently, in step S27, when the destination MAC address is not the MAC address of the transmission device that is the subject of this process, the EtherOAM control unit 14 instructs the hardware unit 20 to transmit the LTM frame from a port that has learned the MAC address. Accordingly, the LTM frame is transferred to a transmission device of a subsequent stage.

Meanwhile, in step S25, when the destination MAC address of the received LTM frame has not been learned, the process proceeds from step S25 to step S28. In step S28, when the destination MAC address is the MAC address of the transmission device that is the subject of this process, the EtherOAM control unit 14 instructs the hardware unit 20 to transmit an LTR frame to the source transmission device that has transmitted the LTM frame. In step S29, when the destination MAC address is not the MAC address of the transmission device that is the subject of this process, the EtherOAM control unit 14 instructs the hardware unit 20 to transmit the LTM frame from all ports that are flooding targets. Accordingly, the LTM frame is transferred to a transmission device of a subsequent stage. When the destination MAC address is the MAC address of the transmission device that is the subject of this process, an LTM frame is not transferred to a transmission device of a subsequent stage. Therefore, the corresponding LTM frame is discarded.

Subsequently, in step S30, the EtherOAM control unit 14 determines whether the second LTM activation status information in the second LTM activation status information storage unit 14A is enabled or disabled. When the second LTM activation status information is enabled, in step S31, the EtherOAM control unit 14 reads route redundancy configuration information of the LTM transferring ports (the ports used for transferring LTM frames), from the route redundancy configuration information storage unit 13A of the redundancy switch control unit 13. Subsequently, in step S32, the EtherOAM control unit 14 determines whether the LTM transferring ports have a route redundancy configuration (i.e., there are plural ports corresponding to different routes) or a non-route redundancy configuration (i.e., there is only a single port corresponding to a single route). When the LTM transferring ports have a route redundancy configuration, in step S33, the EtherOAM control unit 14 instructs the hardware unit 20 to transmit a second LTM frame from a port corresponding to the preliminary system route of a route redundancy configuration. In this case, when there are plural preliminary system routes, identifiers for identifying routes are attached to the frames. Then, the process ends.

Meanwhile, in step S23, when a second LTM frame is received, the process proceeds to step S41 of FIG. 13. In step S41 of FIG. 13, the EtherOAM control unit 14 reads the route redundancy configuration information of the LTM receiving port (the port that has received the LTM frame), from the route redundancy configuration information storage unit 13A of the redundancy switch control unit 13. Then, the EtherOAM control unit 14 determines whether the LTM receiving port is of a route redundancy configuration (i.e., there are plural ports corresponding to different routes) or a non-route redundancy configuration (i.e., there is only a single port corresponding to a single route) (step S42).

In step S42, when it is determined that the LTM receiving port is of a non-route redundancy configuration, the process proceeds from step S42 to step S43, where the EtherOAM control unit 14 reads the MAC learning information from the MAC learning information table 20A of the hardware unit 20, and determines whether the destination MAC address of the LTM frame has been learned. In step S44, when it is determined that the destination MAC address of the LTM frame has been learned, the process proceeds from step S44 to step S45.

In step S45, the EtherOAM control unit 14 instructs the hardware unit 20 to transmit a second LTR frame to the source transmission device that has transmitted the LTM frame. In this operation, the EtherOAM control unit 14 attaches, to the second LTR frame, the same value as that of the received LTM frame, as the preliminary system route identifier. Next, in step S46, when the destination MAC address is not the MAC address of the transmission device that is the subject of this process, the EtherOAM control unit 14 instructs the hardware unit 20 to transmit the second LTM frame from a port that has learned the MAC address. Accordingly, the second LTM frame is transferred to a transmission device of a subsequent stage. Then, the process proceeds to step S30 of FIG. 12.

Meanwhile, in step S44, when it is determined that the destination MAC address of the LTM frame has not been learned, the process proceeds from step S44 to step S47. In step S47, the EtherOAM control unit 14 instructs the hardware unit 20 to transmit a second LTR frame to the source transmission device that has transmitted the LTM frame. In this operation, the EtherOAM control unit 14 attaches, to the second LTR frame, the same value as that of the received LTM frame, as the preliminary system route identifier. Next, in step S48, when the destination MAC address is not the MAC address of the transmission device that is the subject of this process, the EtherOAM control unit 14 instructs the hardware unit 20 to transmit the second LTM frame from all ports that are flooding targets. Accordingly, the LTM frame is transferred to a transmission device of a subsequent stage. When the destination MAC address is the MAC address of the transmission device that is the subject of this process, an LTM frame is not transferred to a transmission device of a subsequent stage. Therefore, the corresponding LTM frame is discarded. Then, the process proceeds to step S30 of FIG. 12.

Meanwhile, in step S42, when it is determined that the LTM receiving port is of a route redundancy configuration, the process proceeds from step S42 to step S49, where the EtherOAM control unit 14 instructs the hardware unit 20 to transmit the second LTR frame to the source transmission device that has transmitted the LTM frame. In this operation, the EtherOAM control unit 14 attaches, to the second LTR frame, the same value as that of the received LTM frame, as the preliminary system route identifier. Next, in step S50, as an LTM frame is not transferred to a transmission device of a subsequent stage, the EtherOAM control unit 14 discards the corresponding LTM frame. Then, the process proceeds to steps S30 of FIG. 12.

<First Embodiment>

FIG. 3 illustrates a communication network according to a first embodiment of the present invention. The communication network illustrated in FIG. 3 has the following configuration. Communications are performed between the transmission device 30 and the transmission device 80. Between the transmission device 40 and the transmission device 70, a route redundancy configuration is provided. Specifically, one operation system route and one preliminary system route are extending from end to end, with the use of a CC function of EtherOAM. In an initial state, the operation system route extends along the transmission device 40, the transmission device 50-1, the transmission device 50-2, the transmission device 50-3, and the transmission device 70. In an initial state, the preliminary system route extends along the transmission device 40, the transmission device 60-1, the transmission device 60-2, the transmission device 60-3, and the transmission device 70.

A description is given of a procedure of identifying the section where a failure has occurred according to the first embodiment of the present invention. For example, this procedure is performed when the state of the communication network changes from that illustrated in FIG. 3 to that illustrated in FIG. 6. Specifically, a failure occurs between the transmission device 50-2 and the transmission device 50-3. The operation system route switches to the route extending along the transmission device 40, the transmission device 60-1, the transmission device 60-2, the transmission device 60-3, and the transmission device 70, to resume communications between the transmission device 30 and the transmission device 80.

As a preliminarily setting for identifying the section where a failure has occurred, a second LTM frame transmission function is activated by using the third function, in the transmission device 40 and the transmission device 80 (process of FIG. 10). The setting of the third function may be set in advance in transmission devices having a route redundancy function, at the time point of establishing the network.

Figure 14:
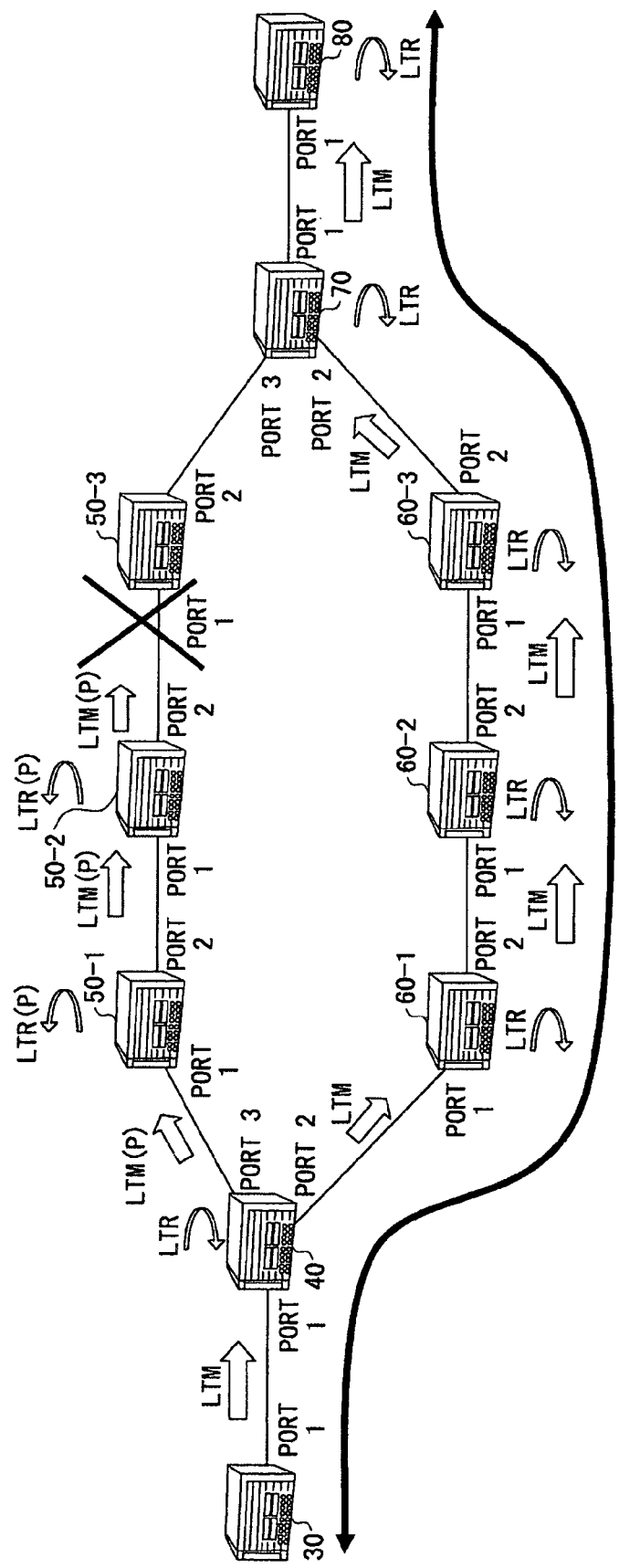
FIG. 14 is for describing link trace after the path has been switched in a communication network.

Next, with reference to FIG. 14, a description is given of the operations of the transmission devices when the transmission device 30 performs link trace to the transmission device 80.

1) The user operates the transmission device 30 to perform link trace by specifying the transmission device 80 as the destination.

2) The transmission device 30 transmits an LTM frame from port 1 (process of FIG. 11).

3) The transmission device 40 receives the LTM frame at port 1, and returns an LTR frame to the transmission device 30 because port 2 of the transmission device 40 has learned the MAC address of the transmission device 80. Then, the LTM frame received at port 1 of the transmission device 40 is transferred to port 2 of the transmission device 40 (process of steps S26 and S27 of FIG. 12). In the transmission device 40, the second LTM activation status is activated, and port 2, which has received the LTM frame, is a route redundancy configuration port (i.e., a port having at least one other counterpart port corresponding to a different route). Therefore, the transmission device 40 transmits a second LTM frame (denoted as LTM (P) in FIG. 14) from port 3, which corresponds to the preliminary system route of the route redundancy configuration (process of steps S31 through S33 in FIG. 12).

Next, a description is given of an operation performed in the route extending along the transmission device 50-1, the transmission device 50-2, the transmission device 50-3, and the transmission device 70.

4-A) The transmission device 50-1 receives the second LTM frame at port 1. Because this frame is a second LTM frame, the transmission device 50-1 returns a second LTR frame (denoted as LTR (P) in FIG. 14) to the transmission device 30, regardless of whether the MAC address of the transmission device 80 has been learned. Then, the second LTM frame received at port 1 of the transmission device 50-1 is transferred to port 2 of the transmission device 50-1 (process of steps S45 through S48 of FIG. 13).

5-A) The transmission device 50-2 receives the second LTM frame at port 1. Because this frame is a second LTM frame, the transmission device 50-2 returns a second LTR frame to the transmission device 30, regardless of whether the MAC address of the transmission device 80 has been learned. Then, the second LTM frame received at port 1 of the transmission device 50-2 is transferred to port 2 of the transmission device 50-2 (process of steps S45 through S48 of FIG. 13).

The second LTM frame transmitted from port 2 of the transmission device 50-2 does not reach the transmission device 50-3 due to a route failure.

Next, a description is given of an operation performed in the route extending along the transmission device 60-1, the transmission device 60-2, the transmission device 60-3, and the transmission device 70.

4-B) The transmission device 60-1 receives an LTM frame at port 1. Because port 2 of the transmission device 60-1 has learned the MAC address of the transmission device 80, the transmission device 60-1 returns an LTR frame to the transmission device 30. Then, the LTM frame received at port 1 of the transmission device 60-1 is transferred to port 2 of the transmission device 60-1 (process of steps S26 and S27 of FIG. 12).

5-B) The transmission device 60-2 receives the LTM frame at port 1. Because port 2 of the transmission device 60-2 has learned the MAC address of the transmission device 80, the transmission device 60-2 returns an LTR frame to the transmission device 30. Then, the LTM frame received at port 1 of the transmission device 60-2 is transferred to port 2 of the transmission device 60-2 (process of steps S26 and S27 of FIG. 12).

6-B) The transmission device 60-3 receives the LTM frame at port 1. Because port 2 of the transmission device 60-3 has learned the MAC address of the transmission device 80, the transmission device 60-3 returns an LTR frame to the transmission device 30. Then, the LTM frame received at port 1 of the transmission device 60-3 is transferred to port 2 of the transmission device 60-3 (process of steps S26 and S27 of FIG. 12).

Next, a description is given of operations of the transmission device 70, the transmission device 80, and the transmission device 30.

7) The transmission device 70 receives the LTM frame at port 2. Because port 1 of the transmission device 70 has learned the MAC address of the transmission device 80, the transmission device 70 returns an LTR frame to the transmission device 30. Then, the LTM frame received at port 2 of the transmission device 70 is transferred to port 1 of the transmission device 70 (process of steps S26 and S27 of FIG. 12).

8) The transmission device 80 receives the LTM frame at port 1. Because the destination of the LTM frame is the transmission device 80, the transmission device 80 returns an LTR frame to the transmission device 30, and then, the LTM frame received at port 1 of the transmission device 80 is discarded (process of steps S28 and S29 of FIG. 12).

9) The transmission device 30 sequentially receives regular LTR frames from the transmission device 40, the transmission device 60-1, the transmission device 60-2, the transmission device 60-3, the transmission device 70, and the transmission device 80, and sequentially receives second LTR frames from the transmission device 50-1 and the transmission device 50-2. The transmission device 30 distinguishes between regular LTR frames and second LTR frames, and reports which type of frame is received to the user in the order the frames are received. Accordingly, the user confirms information relevant to the operation system communication route and the preliminary system route. Furthermore, the user determines that the failure has occurred beyond the transmission device 50-2, because no second LTR frames are returned from the transmission device 50-3 or the transmission device 70. Subsequently, the user operates the transmission device 80 to perform link trace by specifying the transmission device 30 as the destination. Accordingly, the user recognizes that the failure has occurred between the transmission device 50-2 and the transmission device 50-3.

The above describes a method of identifying a failure that has occurred in a section of the old operation system route (i.e., the operation system route used for communications before the failure). This identification is performed after the redundancy switching has been performed (i.e., after the communication route has been switched). However, it is also possible to determine that communications are performed in the preliminary system route, regardless of whether a failure has occurred or not. The following embodiment describes this case.

<Second Embodiment>

Figure 15:
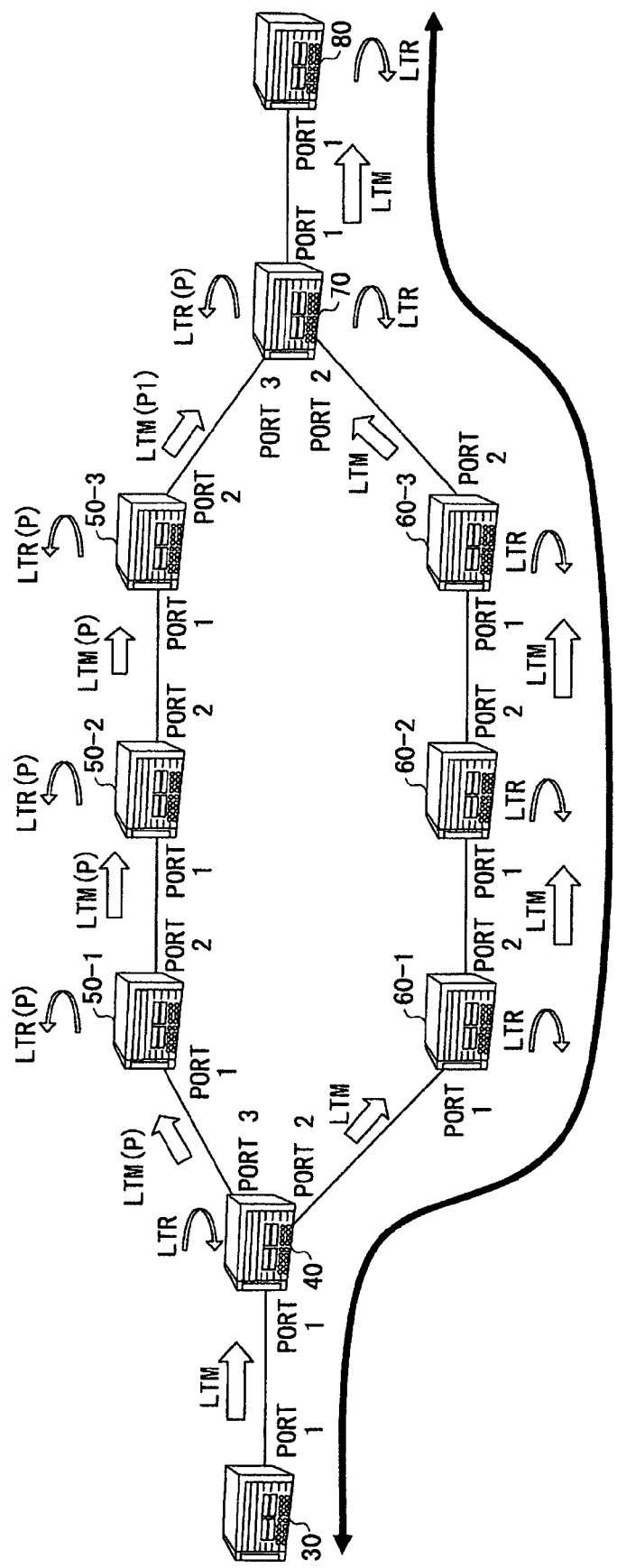
FIG. 15 is for describing link trace in a communication network after recovering from a failure.

A description is given of operations according to a second embodiment of the present invention, which are performed when the failure between the transmission devices 50-2 and 50-3 has recovered, i.e., when the state of the communication network has changed from that of FIG. 14 to that of FIG. 15. As a preliminarily setting for determining the preliminary system communication route and identifying the section where a failure has occurred, a second LTM frame transmission function is activated by using the third function, in the transmission device 40 and the transmission device 70 (process of FIG. 10).

Next, with reference to FIG. 15, a description is given of the operations of the transmission devices according to the second embodiment of the present invention, when the transmission device 30 performs link trace to the transmission device 80.

1) The user operates the transmission device 30 to perform link trace by specifying the transmission device 80 as the destination.

2) The transmission device 30 transmits an LTM frame from port 1 (process of FIG. 11).

3) The transmission device 40 receives the LTM frame at port 1, and returns an LTR frame to the transmission device 30 because port 2 of the transmission device 40 has learned the MAC address of the transmission device 80. Then, the LTM frame received at port 1 of the transmission device 40 is transferred to port 2 of the transmission device 40 (process of steps S26 and S27 of FIG. 12). In the transmission device 40, the second LTM activation status is activated, and port 2, which has received the LTM frame, is a route redundancy configuration port. Therefore, the transmission device 40 transmits a second LTM frame from port 3, which corresponds to the preliminary system route of the route redundancy configuration (process of steps S31 through S33 in FIG. 12).

Next, a description is given of an operation performed in the route extending along the transmission device 50-1, the transmission device 50-2, the transmission device 50-3, and the transmission device 70.

4-A) The transmission device 50-1 receives the second LTM frame at port 1. Because this frame is a second LTM frame, the transmission device 50-1 returns a second LTR frame to the transmission device 30, regardless of whether the MAC address of the transmission device 80 has been learned. Then, the second LTM frame received at port 1 of the transmission device 50-1 is transferred to port 2 of the transmission device 50-1 (process of steps S45 through S48 of FIG. 13).

5-A) The transmission device 50-2 receives the second LTM frame at port 1. Because this frame is a second LTM frame, the transmission device 50-2 returns a second LTR frame to the transmission device 30, regardless of whether the MAC address of the transmission device 80 has been learned. Then, the second LTM frame received at port 1 of the transmission device 50-2 is transferred to port 2 of the transmission device 50-2 (process of steps S45 through S48 of FIG. 13).

6-A) The transmission device 50-3 receives the second LTM frame at port 1. Because this frame is a second LTM frame, the transmission device 50-3 returns a second LTR frame to the transmission device 30, regardless of whether the MAC address of the transmission device 80 has been learned. Then, the second LTM frame received at port 1 of the transmission device 50-3 is transferred to port 2 of the transmission device 50-2 (process of steps S45 through S48 of FIG. 13).

Next, a description is given of an operation performed in the route extending along the transmission device 60-1, the transmission device 60-2, the transmission device 60-3, and the transmission device 70.

4-B) The transmission device 60-1 receives an LTM frame at port 1. Because port 2 of the transmission device 60-1 has learned the MAC address of the transmission device 80, the transmission device 60-1 returns an LTR frame to the transmission device 30. Then, the LTM frame received at port 1 of the transmission device 60-1 is transferred to port 2 of the transmission device 60-1 (process of steps S26 and S27 of FIG. 12).

5-B) The transmission device 60-2 receives the LTM frame at port 1. Because port 2 of the transmission device 60-2 has learned the MAC address of the transmission device 80, the transmission device 60-2 returns an LTR frame to the transmission device 30. Then, the LTM frame received at port 1 of the transmission device 60-2 is transferred to port 2 of the transmission device 60-2 (process of steps S26 and S27 of FIG. 12).

6-B) The transmission device 60-3 receives the LTM frame at port 1. Because port 2 of the transmission device 60-3 has learned the MAC address of the transmission device 80, the transmission device 60-3 returns an LTR frame to the transmission device 30. Then, the LTM frame received at port 1 of the transmission device 60-3 is transferred to port 2 of the transmission device 60-3 (process of steps S26 and S27 of FIG. 12).

Next, a description is given of operations of the transmission device 70, the transmission device 80, and the transmission device 30.

7) The transmission device 70 receives the LTM frame at port 2. Because port 1 of the transmission device 70 has learned the MAC address of the transmission device 80, the transmission device 70 returns an LTR frame to the transmission device 30. Then, the LTM frame received at port 2 of the transmission device 70 is transferred to port 1 of the transmission device 70 (process of steps S26 and S27 of FIG. 12). The transmission device 70 receives the second LTM frame at port 3. Because this frame is a second LTM frame, the transmission device 70 returns a second LTR frame to the transmission device 30, regardless of whether the MAC address of the transmission device 80 has been learned. Because port 3 of the transmission device 70 is a route redundancy configuration port, the second LTM frame is discarded at the transmission device 70 without being transferred to a transmission device of a subsequent stage (process of steps S49 and S50 of FIG. 13).

8) The transmission device 80 receives the LTM frame at port 1. Because the destination of the LTM frame is the transmission device 80, the transmission device 80 returns an LTR frame to the transmission device 30, and then, the LTM frame received at port 1 of the transmission device 80 is discarded (process of steps S28 and S29 of FIG. 12).

9) The transmission device 30 sequentially receives regular LTR frames from the transmission device 40, the transmission device 60-1, the transmission device 60-2, the transmission device 60-3, the transmission device 70, and the transmission device 80, and sequentially receives second LTR frames from the transmission device 50-1, the transmission device 50-2, the transmission device 50-3, and the transmission device 70. The transmission device 30 distinguishes between regular LTR frames and second LTR frames, and reports which type of frame is received to the user in the order the frames are received. Accordingly, the user confirms information relevant to the operation system communication route and the preliminary system route.

<Third Embodiment>

Figure 16:
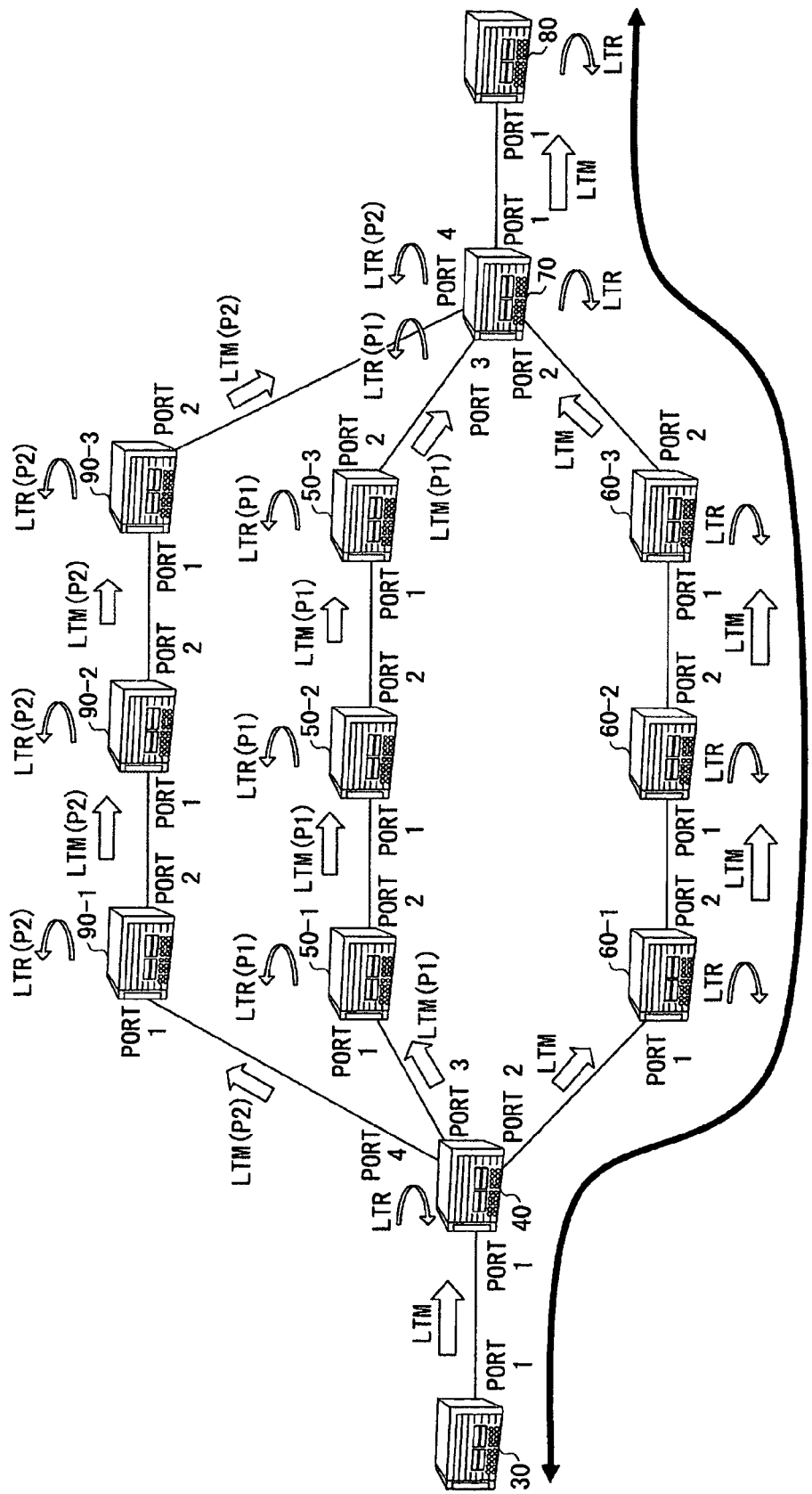
FIG. 16 is for describing link trace performed in a communication network having an N route redundancy configuration.

The communication networks according to the first and second embodiments include one operation system route and one preliminary system route. FIG. 16 is for describing link trace performed in a communication network having a route redundancy configuration including one operation system route and plural (N) preliminary system routes according to a third embodiment of the present invention.

In the example of FIG. 16, as a preliminarily setting for determining the preliminary system communication route and identifying the section where a failure has occurred, a second LTM frame transmission function is activated by using the third function, in the transmission device 40 and the transmission device 70 (process of FIG. 10).

Next, with reference to FIG. 16, a description is given of the operations of the transmission devices according to the third embodiment of the present invention, when the transmission device 30 performs link trace to the transmission device 80.

1) The user operates the transmission device 30 to perform link trace by specifying the transmission device 80 as the destination.

2) The transmission device 30 transmits an LTM frame from port 1 (process of FIG. 11).

3) The transmission device 40 receives the LTM frame at port 1, and returns an LTR frame to the transmission device 30 because port 2 of the transmission device 40 has learned the MAC address of the transmission device 80. Then, the LTM frame received at port 1 of the transmission device 40 is transferred to port 2 of the transmission device 40 (process of steps S26 and S27 of FIG. 12). In the transmission device 40, the second LTM activation status is activated, and port 2, which has received the LTM frame, is a route redundancy configuration port. Therefore, the transmission device 40 transmits a second LTM frame from port 3 and port 4, which correspond to the preliminary system routes of the route redundancy configuration (process of steps S31 through S33 in FIG. 12). At this point, different preliminary system route identifiers are attached to the second LTM frames that are transmitted from ports 3 and 4.

Next, a description is given of an operation performed in the route extending along the transmission device 50-1, the transmission device 50-2, the transmission device 50-3, and the transmission device 70.

4-A) The transmission device 50-1 receives the second LTM frame at port 1. Because this frame is a second LTM frame, the transmission device 50-1 returns a second LTR frame to the transmission device 30, regardless of whether the MAC address of the transmission device 80 has been learned. Then, the second LTM frame received at port 1 of the transmission device 50-1 is transferred to port 2 of the transmission device 50-1 (process of steps S45 through S48 of FIG. 13).

5-A) The transmission device 50-2 receives the second LTM frame at port 1. Because this frame is a second LTM frame, the transmission device 50-2 returns a second LTR frame to the transmission device 30, regardless of whether the MAC address of the transmission device 80 has been learned. Then, the second LTM frame received at port 1 of the transmission device 50-2 is transferred to port 2 of the transmission device 50-2 (process of steps S45 through S48 of FIG. 13).

6-A) The transmission device 50-3 receives the second LTM frame at port 1. Because this frame is a second LTM frame, the transmission device 50-3 returns a second LTR frame to the transmission device 30, regardless of whether the MAC address of the transmission device 80 has been learned. Then, the second LTM frame received at port 1 of the transmission device 50-3 is transferred to port 2 of the transmission device 50-2 (process of steps S45 through S48 of FIG. 13).

Next, a description is given of an operation performed in the route extending along the transmission device 60-1, the transmission device 60-2, the transmission device 60-3, and the transmission device 70.

4-B) The transmission device 60-1 receives an LTM frame at port 1. Because port 2 of the transmission device 60-1 has learned the MAC address of the transmission device 80, the transmission device 60-1 returns an LTR frame to the transmission device 30. Then, the LTM frame received at port 1 of the transmission device 60-1 is transferred to port 2 of the transmission device 60-1 (process of steps S26 and S27 of FIG. 12).

5-B) The transmission device 60-2 receives the LTM frame at port 1. Because port 2 of the transmission device 60-2 has learned the MAC address of the transmission device 80, the transmission device 60-2 returns an LTR frame to the transmission device 30. Then, the LTM frame received at port 1 of the transmission device 60-2 is transferred to port 2 of the transmission device 60-2 (process of steps S26 and S27 of FIG. 12).

6-B) The transmission device 60-3 receives the LTM frame at port 1. Because port 2 of the transmission device 60-3 has learned the MAC address of the transmission device 80, the transmission device 60-3 returns an LTR frame to the transmission device 30. Then, the LTM frame received at port 1 of the transmission device 60-3 is transferred to port 2 of the transmission device 60-3 (process of steps S26 and S27 of FIG. 12).

Next, a description is given of an operation performed in the route extending along a transmission device 90-1, a transmission device 90-2, a transmission device 90-3, and the transmission device 70.

4-A) The transmission device 90-1 receives the second LTM frame at port 1. Because this frame is a second LTM frame, the transmission device 90-1 returns a second LTR frame to the transmission device 30, regardless of whether the MAC address of the transmission device 80 has been learned. Then, the second LTM frame received at port 1 of the transmission device 90-1 is transferred to port 2 of the transmission device 90-1 (process of steps S45 through S48 of FIG. 13).

5-A) The transmission device 90-2 receives the second LTM frame at port 1. Because this frame is a second LTM frame, the transmission device 90-2 returns a second LTR frame to the transmission device 30, regardless of whether the MAC address of the transmission device 80 has been learned. Then, the second LTM frame received at port 1 of the transmission device 90-2 is transferred to port 2 of the transmission device 90-2 (process of steps S45 through S48 of FIG. 13).

6-A) The transmission device 90-3 receives the second LTM frame at port 1. Because this frame is a second LTM frame, the transmission device 90-3 returns a second LTR frame to the transmission device 30, regardless of whether the MAC address of the transmission device 80 has been learned. Then, the second LTM frame received at port 1 of the transmission device 90-3 is transferred to port 2 of the transmission device 90-2 (process of steps S45 through S48 of FIG. 13).

Next, a description is given of operations of the transmission device 70, the transmission device 80, and the transmission device 30.

7) The transmission device 70 receives the LTM frame at port 2. Because port 1 of the transmission device 70 has learned the MAC address of the transmission device 80, the transmission device 70 returns an LTR frame to the transmission device 30. Then, the LTM frame received at port 2 of the transmission device 70 is transferred to port 1 of the transmission device 70 (process of steps S26 and S27 of FIG. 12). The transmission device 70 receives the second LTM frame at port 3. Because this frame is a second LTM frame, the transmission device 70 returns a second LTR frame to the transmission device 30, regardless of whether the MAC address of the transmission device 80 has been learned. Because port 3 of the transmission device 70 is a route redundancy configuration port, the second LTM frame is discarded at the transmission device 70 without being transferred to a transmission device of a subsequent stage (process of steps S49 and S50 of FIG. 13). The transmission device 70 receives the second LTM frame at port 4. Because this frame is a second LTM frame, the transmission device 70 returns a second LTR frame to the transmission device 30, regardless of whether the MAC address of the transmission device 80 has been learned. Because port 4 of the transmission device 70 is a route redundancy configuration port, the second LTM frame is discarded at the transmission device 70 without being transferred to a transmission device of a subsequent stage (process of steps S49 and S50 of FIG. 13).

8) The transmission device 80 receives the. LTM frame at port 1. Because the destination of the LTM frame is the transmission device 80, the transmission device 80 returns an LTR frame to the transmission device 30, and then, the LTM frame received at port 1 of the transmission device 80 is discarded (process of steps S28 and S29 of FIG. 12).

9) The transmission device 30 sequentially receives regular LTR frames from the transmission device 40, the transmission device 60-1, the transmission device 60-2, the transmission device 60-3, the transmission device 70, and the transmission device 80. Furthermore, the transmission device 30 sequentially receives second LTR frames, to which a "preliminary system route identifier 1" is attached, from the transmission device 50-1, the transmission device 50-2, the transmission device 50-3, and the transmission device 70. Furthermore, the transmission device 30 sequentially receives second LTR frames, to which a "preliminary system route identifier 2" is attached, from the transmission device 90-1, the transmission device 90-2, the transmission device 90-3, and the transmission device 70. The transmission device 30 distinguishes between regular LTR frames, second LTR frames with the "preliminary system route identifier 1", and second LTR frames with the "preliminary system route identifier 2", and reports which type of frame is received to the user in the order the frames are received. Accordingly, the user confirms information relevant to the operation system communication route and the preliminary system routes.

According to an aspect of the present invention, it is possible to determine the communication route in a communication network having a route redundancy configuration.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission device included in a communication network, the transmission device comprising:
a link trace frame transfer unit that transfers a received first link trace frame and a second link trace frame from a first transferring port corresponding to an operation system route, and a second transferring port corresponding to a preliminary system route, respectively, when transferring ports of the transmission device have a route redundancy configuration,
wherein the first link trace frame is destined to a target transmission device and the second link trace frame includes an identifier that distinguishes the second link trace frame from the first link trace frame; and
a link trace response frame transmission unit that, in response to receiving the first link trace frame, determines whether a destination address of the received first link trace frame has been learned and transmits a first link trace response frame to an origin transmission device when determining that the destination address of the received first link trace frame has been learned, and transmits, in response to receiving the second link trace frame, a second link trace response frame to the origin transmission device regardless of whether a destination address of the second link trace frame has been learned, the second link trace response frame distinguishable from the first link trace response frame.

2. The transmission device according to claim 1, wherein the second link trace frame and the second link trace response frame include identifiers used for distinguishing between a plurality of the preliminary system routes in the communication network.

3. The transmission device according to claim 2, further comprising:
a link trace frame discarding unit that discards the second link trace frame that is received, when receiving ports of the transmission device have a route redundancy configuration.

4. The transmission device according to claim 3, further comprising:
an activation control unit that activates or inactivates the link trace frame transfer unit.

5. The transmission device according to claim 4, further comprising:
a response report unit that sends, to a user, a report that the first link trace response frame and the second link trace response frame have been received, wherein the first link trace response frame and the second link trace response frame are distinguished from each other in the report.

6. A communication route determination method to determine communication routes in a communication network that uses a route redundancy configuration, the communication route determination method comprising:
transferring a first link trace frame from an origin transmission device to a target transmission device along an operation system route;
in response to receiving the first link trace frame, determining, by a transmission device that has received the first link trace frame, whether a destination address of the received first link trace frame has been learned, and transmitting, by the transmission device that has received the first link trace frame, a first link trace response frame to the origin transmission device when determining that the destination address of the received first link trace frame has been learned;
transferring a second link trace frame along a preliminary system route, the second link trace frame including an identifier that distinguishes the second link trace frame from the first link trace frame; and
transmitting a second link trace response frame, which is distinguishable from the first link trace response frame, from a transmission device that has received the second link trace frame to the origin transmission device regardless of whether a destination address of the second link trace frame has been learned in the transmission device that has received the second link trace frame.

7. The communication route determination method according to claim 6, wherein
the transferring of the second link trace frame includes attaching, to the second link trace frame, an identifier used for distinguishing between a plurality of the preliminary system routes in the communication network, and
the transmitting of the second link trace response frame includes attaching, to the second link trace response frame, the identifier used for distinguishing between the plural preliminary system routes in the communication network.

8. The communication route determination method according to claim 7, further comprising:
discarding the second link trace frame that is received, when the second link trace frame is received through the preliminary system route after the first link trace frame is received through the operation system route, and when receiving ports of the transmission device that has received the second link trace frame have a route redundancy configuration.

9. The communication route determination method according to claim 8, further comprising:

sending, to a user, a report that the first link trace response frame and the second link trace response frame have been received by the origin transmission device, wherein the first link trace response frame and the second link trace response frame are distinguished from each other in the report.

\* \* \* \* \*